US011589967B2

(12) United States Patent
Touati et al.

(10) Patent No.: US 11,589,967 B2
(45) Date of Patent: Feb. 28, 2023

(54) IMPLANT

(71) Applicant: Cudeti SAGL, Lugano (CH)

(72) Inventors: Bernard Touati, Neuilly (FR); Marco Ravanello, Gentilino (CH)

(73) Assignee: CUDETI SAGL, Lugano (CH)

( * ) Notice: Subject to any disclaimer, the term of this patent is extended or adjusted under 35 U.S.C. 154(b) by 0 days.

(21) Appl. No.: 16/318,095

(22) PCT Filed: Jul. 17, 2017

(86) PCT No.: PCT/GB2017/052093
§ 371 (c)(1),
(2) Date: Jan. 15, 2019

(87) PCT Pub. No.: WO2018/011604
PCT Pub. Date: Jan. 18, 2018

(65) Prior Publication Data

US 2020/0030065 A1 Jan. 30, 2020

(30) Foreign Application Priority Data

Jul. 15, 2016 (EP) .................................... 16305922
Nov. 7, 2016 (GB) .................................... 1618722

(51) Int. Cl.
*A61C 8/00* (2006.01)
*A61C 13/30* (2006.01)

(52) U.S. Cl.
CPC ............ *A61C 13/30* (2013.01); *A61C 8/0013* (2013.01); *A61C 2008/0046* (2013.01)

(58) Field of Classification Search
CPC ................ A61C 8/0012; A61C 8/0013; A61C 2008/0046; A61C 13/30; A61C 8/0034–0045
See application file for complete search history.

(56) References Cited

U.S. PATENT DOCUMENTS 5,989,027 A * 11/1999 Wagner ................ A61C 8/0006 433/173
8,684,734 B1 * 4/2014 Lyren ................. A61L 27/3865 433/173

(Continued)

FOREIGN PATENT DOCUMENTS

CN 102525672 A 7/2012
CN 105903967 A 8/2016

(Continued)

OTHER PUBLICATIONS

Nguyen et al "Conformal Lattice Structure Design and Fabrication", 2012 (Year: 2012).*

(Continued)

*Primary Examiner* — Edward Moran
(74) *Attorney, Agent, or Firm* — Scale LLP

(57) ABSTRACT

An implant to retain facial or dental prostheses includes a bone-engaging portion, a transmucosal portion, and an abutment portion. The bone-engaging portion of the implant includes a longitudinally extending distal portion formed of a conformal microscale cell structure and, optionally, a non-biological coating. The transmucosal portion includes a plurality of micro holes. The abutment portion of the implant may be polished to a mirrored or super-mirrored finish.

13 Claims, 12 Drawing Sheets

(b) 30 24 86 43 51 72 34 49 44

(56) References Cited

U.S. PATENT DOCUMENTS

2005/0112397 A1 5/2005 Rolfe et al.
2006/0105295 A1 5/2006 Mayer et al.
2006/0147332 A1 7/2006 Jones et al.
2007/0231364 A1 10/2007 Nishimoto et al.
2007/0264612 A1* 11/2007 Mount .................... A61C 8/00 433/173
2008/0050699 A1* 2/2008 Zhang ................. A61C 8/0006 433/171
2008/0090207 A1 4/2008 Rubbert
2010/0151421 A1* 6/2010 Devengencie ......... A61C 8/005 433/174
2011/0086328 A1 4/2011 Wedeking
2012/0070802 A1 3/2012 Woodward, III
2012/0148983 A1* 6/2012 Mullen .................. B22F 10/20 433/174
2012/0308963 A1 12/2012 Hasselgren et al.
2013/0323677 A1 12/2013 Pearson
2014/0038134 A1 2/2014 Nguyen
2014/0363481 A1* 12/2014 Pasini .................. B22F 3/1103 703/1
2015/0104665 A1 4/2015 Beeby
2015/0320525 A1 11/2015 Lin et al.
2016/0052162 A1 2/2016 Colin et al.
2016/0166360 A1* 6/2016 Bartlomiej ............. A61L 27/24 433/173
2019/0053882 A1 2/2019 Le
2019/0290402 A1* 9/2019 Djemai .................. A61K 6/822
2019/0388971 A1 12/2019 Jung et al.
2020/0047252 A1 2/2020 Kritchman et al.
2021/0244512 A1* 8/2021 Clukey, Jr. .............. A61L 27/20

FOREIGN PATENT DOCUMENTS

CN 106041074 A 10/2016
CN 106361455 A 2/2017
CN 107130138 A 9/2017
CN 108578763 A 9/2018
CN 109758245 A 5/2019
CN 109865835 A 6/2019
CN 109965996 A 7/2019
CN 110037813 A 7/2019
CN 110353836 A 10/2019
CN 110433329 A 11/2019
CN 110882414 A 3/2020
CN 110899688 A 3/2020
DE 102 59 942 A1 7/2004
EP 0 763 350 A1 3/1997
EP 1 419 746 A2 5/2004
WO 94/12120 A1 6/1994
WO 2004/082505 A2 9/2004
WO 2004/098378 A2 11/2004
WO 2005/055858 A1 6/2005
WO WO-2005107829 A2 * 11/2005 ............. A61L 27/56
WO 2006/120572 A2 11/2006
WO 2007/097747 A1 8/2007
WO 2010/139041 A1 12/2010
WO 2012/087390 A1 6/2012
WO 2012/142127 A1 10/2012
WO 2013/113249 A1 8/2013
WO 2014/028505 A1 2/2014
WO 2014/112188 A1 7/2014
WO 2015/145450 A1 10/2015
WO 2015/168332 A2 11/2015
WO 2018/100250 A1 6/2018
WO 2019095660 A1 5/2019

OTHER PUBLICATIONS

International Search Report and Written Opinion dated Feb. 12, 2018 issued in International Application No. PCT/GB2017/052093. (27 pages).
UK Search Report dated Mar. 14, 2017 issued in Application No. GB1618722.1. (6 pages).
Figliuzzi, M. et al., "A novel root analogue dental implant using CT scan and CAD/CAM: selective laser melting technology", Int. J. Oral Maxillofac. Surg. 2012, 41: 858-862.
International Preliminary Report on Patentability dated Jan. 15, 2019 issued in corresponding International Application No. PCT/GB2017/052093. (20 pages).
Extended European Search Report dated Mar. 3, 2021 in related European Patent Application No. 20208871.2 (6 pages).
EP Notice of Opposition in European Patent Application No. 17740075.1 dated Aug. 30, 2021 (29 pages total).
P. Dudek et al., "Rapid Prototyping: Technologies, Materials and Advances", Arch. Metall. Mater., vol. 61, No. 2, Jul. 2016, p. 891-896, DOI: 10.1515/amm-2016-0151 (6 pages total).

* cited by examiner (a)

(b)

(a)
(b)
proximal
distal
30
49
24
43
51
34
44
61
6
5
3.6
3
4.5
2
1.4
1.5
1
4
8

(a)

(b)

IMPLANT

This application is a 35 U.S.C. § 371 National Stage of International Patent Application no. PCT/GB2017/052093, filed Jul. 17, 2017, designating the United States and claiming priority to European patent application no. 16305922.3, filed Jul. 15, 2016 and United Kingdom patent application no. 1618722.1, filed Nov. 7, 2016.

FIELD OF THE INVENTION

The present invention relates to an implant—such as an implant to retain facial or dental prostheses. In particular, the present invention is concerned with an implant that can be inserted into bone and soft tissue—such as marginal soft tissue. A particular form of implant contemplated herein is a maxillofacial implant or a dental implant.

BACKGROUND

A range of oral and maxillofacial surgical operations can be carried out on a human or animal subject which can include the placement of dental or facial implants. They can be used to treat facial injuries, craniofacial fractures, soft tissue injuries of the mouth, face, and neck. They can be used in reconstructive surgery, orthognathic surgery, pre-implant surgery, including the use of implants to retain facial or dental prostheses and associated bone grafting techniques as part of oro-facial reconstruction. A common kind of implant is a dental implant that can be surgically implanted into a human or animal subject's jaw bone to support an artificial tooth and restore chewing function. The artificial tooth is typically a prosthesis—such as a crown—manufactured in accordance with methods that are well known in the art. The implant has a longitudinally extending distal portion with a standardised cross sectional area and a standardised length. Often the implant is either threaded or press-fit into a void or bore which is drilled into the human or animal subject's mandible or maxilla jaw bone at the edentulous site. The press-fit implant is usually inserted by applying a force to the implant in an insertion direction. For a threaded implant, self-tapping threads can be used for initial stability of the implant immediately after surgery. Before biological integration has time to take place, the threads can try to resist tension, twisting, or bending loads applied to the implant.

The placement of dental implants requires a proper fixation in the jaw bone to provide initial stability. For proper fixation a sufficient bone volume at the site of implantation is essential. For example, the quantity (eg. height) of the bone, the bone quality (eg. bone density) and a proper healing of the implant into the jaw is important for proper fixation. In particular, for certain dental implants to be successful, the jawbone must have enough bone height and bone density to support the implant. If the bone height under the gum is not sufficient, is not wide enough or both, or the bone density is not sufficient then a procedure to add bone to the jaw before implants can be placed is often required. In 30-40% of all dental implant procedures an augmentation of bone prior to implantation is necessary. Depending on the location of the implantation site, a number of different bone augmentation procedures can be applied and it can take 5-6 months following the procedure to achieve sufficient bone for the insertion of a dental implant. Sinus lift is commonly applied to augment bone in the upper jaw. The procedure increases the height of the jaw by filling part of the maxillary sinus with bone. In cases where the jaw ridge is too thin to place dental implants, ridge expansion can be applied. This is achieved by mechanically extending the jaw ridge, often using bone substitute material to augment bone at the jaw ridge. All of these techniques are inconvenient, traumatic, require extended healing times, suffer from a high risk of rejection and add additional cost and time to the dental implant procedure.

There is a continuing need in the art for an improved implant. The present invention seeks to address this need.

SUMMARY OF THE INVENTION

There is described herein an implant which can both integrate into bone and integrate into soft tissue. In certain embodiments, the implant can allow for immediate or very early loading. In certain embodiments, the implant can increase long-term stability due to improved osseointegration and improved integration into soft tissue. In certain embodiments, the implant can offer increased precision of fit and can benefit from lower levels of implant rejection. The implant can be of use in human or animal subjects that have anatomical barriers as the use of the implant can avoid the complexities and cost of bone grafting or surgery and the like. If the implant is a dental implant then it is applicable for use in human or animal subjects in which a tooth is to be replaced or in human or animal subjects that have a void that requires the placement of an implant. According to certain embodiments, the implant is a patient customised or an individualised implant. The implant can be structured in different areas, for example, in four different areas. It can be a completely customised or individualised implant that is adapted to fit the subject into which the implant is to be inserted. Advantageously, the implant can be a precision fit that is adapted to correspond to the shape and size of the natural tooth in situ or the natural void in situ in to which it is to be implanted. It can also take account of the subject's anatomical requirements. According to certain embodiments, the implant is a patient customised digital additive layer manufactured implant that is custom manufactured to a subject's specific anatomical and clinical requirements. A digital approach involving Computed Tomography (CT) scanning and/or Cone-Beam Computed Tomography (CBCT) and/or intra-oral scanning the surface of the bone contacting area can be used to manufacture a conformal micro cell structure to match or correspond to the existing bone mineral density/bone quality. This may enhance osseointegration. Likewise, the surface of the transmucosal area of the implant can be prepared by inserting micro holes therein which can promote soft tissue adhesion and attachment through the collagen fibers/collagen fiber bundles of the connective tissue to favour biological mucosal integration of the implant system.

In one aspect, there is disclosed an implant comprising: (a) a bone engaging portion positioned at the distal end of the implant, said bone engaging portion comprising: a longitudinally extending distal portion; and an adjoining region positioned at the proximal end of the longitudinally extending distal portion; (b) a transmucosal portion positioned at the proximal end of the adjoining region; and (c) an abutment portion positioned at the proximal end of the transmucosal portion. The exterior surface of the longitudinally extending distal portion comprises a conformal microscale cell structure and optionally, a non-biological coating; wherein the exterior surface of the abutment portion is polished, suitably, to a mirrored or super mirrored finish and/or wherein the exterior surface of the abutment portion has an $R_a$ of between about 1 and about 3 um; wherein the exterior surface of the adjoining region comprises a roughened surface, suitably with an $R_a$ of between about 5 and about 30 um; and wherein the exterior surface of the transmucosal portion comprises a plurality of micro holes.

Suitably, the conformal microscale cell structure extends up to about 50% of the diameter of the implant.

Suitably, the longitudinally extending distal portion comprises a solid longitudinally extending core which extends up to about 50% of the diameter of the longitudinally extending distal portion.

Suitably, the conformal microscale cell structure of the longitudinally extending distal portion comprises cells sized in the range of about 20 um to about 50 um in length, suitably wherein the cells are sized in the range of about 25 um to about 50 um in length, or about 28 to 50 um in length, or about 31 and 50 um in length, or about 36 and 50 um in length.

Suitably, the conformal microscale cell structure is adapted to conform to the bone mineral density or the bone quality of a subject into which the implant is to be inserted.

Suitably, if the bone mineral density is 1 in said subject then the cells are sized in the range of about 25 um to about 50 um in length.

Suitably, if the bone mineral density is 2 in said subject then the cells are sized in the range of about 28 um to about 50 um in length.

Suitably, if the bone mineral density is 3 in said subject then the cells are sized in the range of about 30 um to about 50 um in length.

Suitably, if the bone mineral density is 4 in said subject then the cells are sized in the range of about 35 um to about 50 um in length.

Suitably, the longitudinally extending distal portion is shaped as a cylinder or comprises a screw thread.

Suitably, the shape, size and height of the abutment portion is adapted to fit a subject into which the implant is to be inserted.

Suitably, at least a portion of the exterior surface of the adjoining region comprises a polished finish at the proximal end thereof, suitably, wherein the polished finish is a mirrored or super mirrored finish.

Suitably, the polished finish at the distal end of the adjoining region has a height of about 100 um.

Suitably, the shape, size and height of the adjoining region is adapted to fit a subject into which the implant is to be inserted.

Suitably, the micro holes in the transmucosal portion are between about 1 to about 15 um in diameter, suitably, between about 1 to about 10 um in diameter.

Suitably, the depth of the micro holes in the transmucosal portion is between about 10 to about 150 um and/or wherein the transmucosal portion comprises between about 50 to about 5000 micro holes.

Suitably, the transmucosal portion comprises a plurality of layers comprising the micro holes, suitably, wherein the micro holes are regularly spaced in the layers.

Suitably, the transmucosal portion comprises at least 4 layers, each layer comprising at least about 50 micro holes.

Suitably, the transmucosal portion comprises at least 8 layers, each layer comprising at least about 50 micro holes.

Suitably, the transmucosal portion is adapted to conform to the thickness of the marginal soft tissue of a subject into which the implant is to be inserted.

Suitably, if the marginal soft tissue has a thickness of between about 0.6 mm to 0.7 mm the transmucosal portion comprises at least 4 layers of micro holes, each layer comprising at least about 50 micro holes. Suitably, if the marginal soft tissue has a thickness of between about 0.6 mm to 0.7 mm the transmucosal portion is configured to comprise 4 or 5 layers of micro holes, each layer comprising at least about 50 micro holes.

Suitably, if the marginal soft tissue has a thickness of between about 0.9 mm to 1.0 mm the transmucosal portion is configured to comprise at least about 6 layers of micro holes, each layer comprising at least about 50 micro holes. Suitably, if the marginal soft tissue has a thickness of between about 0.9 mm to 1.0 mm the transmucosal portion is configured to comprise 6 or 7 layers of micro holes, each layer comprising at least about 50 micro holes. Suitably, if the marginal soft tissue has a thickness of between about 1.3 mm to about 1.5 mm the transmucosal portion comprises at least 8 layers of micro holes, each layer comprising at least about 50 micro holes.

Suitably, the distribution of the micro holes in the transmucosal portion is adapted to facilitate or improve the integration of the transmucosal portion with the collagen fibers in the marginal soft tissue of a subject into which the implant is to be inserted.

Suitably, each part of the implant is made of titanium.

Suitably, the implant is a one-piece or a two piece implant.

Suitably, one part of the two piece implant comprises the transmucosal portion and the abutment portion and a second piece of the implant comprises the longitudinally extending distal portion and the adjoining region.

Suitably, each part of the implant is shaped to fit the subject into which the implant is to be inserted.

In another aspect, there is disclosed an implant comprising a portion adapted to abut bone, suitably a longitudinally extending distal portion, wherein the exterior surface of the portion adapted to engage bone comprises a conformal microscale cell structure.

In another aspect, there is disclosed an implant comprising a portion adapted to abut marginal soft tissue, suitably a transmucosal portion adapted to engage marginal soft tissue, wherein the portion adapted to abut or engage marginal soft tissue comprises a plurality of micro holes in the external surface thereof.

In another aspect, there is disclosed an implant comprising the portion adapted to engage bone and the portion adapted to engage marginal soft tissue. According to this aspect, the implant can further comprise (a) an adjoining region positioned at the proximal end of the portion adapted to engage bone, suitably, the longitudinally extending distal portion; and (b) an abutment portion positioned at the proximal end of the portion adapted to engage marginal soft tissue, suitably the transmucosal portion.

In another aspect, there is disclosed an implantation set comprising the implant described herein and at least one implant processing tool which is adapted in shape to the implant to be implanted, suitably wherein the implant processing tool is selected from a positioning jig or a press fit tool for press fit insertion of the implant or an ultrasonic surgery instrument for laser cutting requiring a positioning jig.

In another aspect, there is disclosed a method of configuring an implant described herein comprising: (i) determining the mandibular bone size and shape around a natural tooth in situ or a natural void in situ in which a natural tooth has previously been present; (ii) determining one or more anatomical structures around the natural tooth or the natural void, said anatomical structures selected from the group consisting of blood vessels, nerves, roots and the position of adjoining teeth or a combination of two or more thereof; (iii) determining the mandibular bone mineral density and/or the mandibular bone quality around the natural tooth in situ or the natural void in situ; (iv) determining the marginal soft tissue thickness around the natural tooth in situ or the natural void in situ to determine the quantity of collagen fibers therein; (v) using the results obtained in step (i) and step (ii) and step (iii) to configure the size, shape and conformal microscale cell structure of the longitudinally extending distal portion; (vi) using the results obtained in step (i) and step (ii) to configure the size and shape of the adjoining region and the abutment portion; and (vii) using the results obtained in steps (i) to (ii) and (iv) to configure the size, shape and micro hole structure of the transmucosal portion; wherein steps (i) to (iv) are performed in any order and wherein steps (v) to (vii) are performed in any order. Suitably, if the marginal soft tissue has a thickness of between about 0.6 mm to 0.7 mm the transmucosal portion is configured to comprise at least about 4 layers of micro holes, each layer comprising at least about 50 micro holes.

Suitably, if the marginal soft tissue has a thickness of between about 0.6 mm to 0.7 mm the transmucosal portion is configured to comprise 4 or 5 layers of micro holes, each layer comprising at least about 50 micro holes.

Suitably, if the marginal soft tissue has a thickness of between about 0.9 mm to 1.0 mm the transmucosal portion is configured to comprise at least about 6 layers of micro holes, each layer comprising at least about 50 micro holes. Suitably, if the marginal soft tissue has a thickness of between about 0.9 mm to 1.0 mm the transmucosal portion is configured to comprise 6 or 7 layers of micro holes, each layer comprising at least about 50 micro holes. Suitably, if the marginal soft tissue has a thickness of between about 1.3 mm to about 1.5 mm the transmucosal portion is configured to comprise at least about 8 layers of micro holes, each layer comprising at least about 50 micro holes.

Suitably, the distribution of the micro holes in the transmucosal portion is adapted to facilitate or improve the integration of the transmucosal portion with the collagen fibers in the marginal soft tissue of a subject into which the implant is to be inserted.

Suitably, if the bone mineral density determined in step (iii) is 1 then the cells in the conformal microscale cell structure of the bone engaging portion are sized in the range of about 25 um to about 50 um in length.

Suitably, if the bone mineral density determined in step (iii) is 2 then the cells in the conformal microscale cell structure of the bone engaging portion are sized in the range of about 28 um to about 50 um in length.

Suitably, if the bone mineral density determined in step (iii) is 3 then the cells in the conformal microscale cell structure of the bone engaging portion are sized in the range of about 30 um to about 50 um in length.

Suitably, if the bone mineral density determined in step (iii) is 4 then the cells in the conformal microscale cell structure of the bone engaging portion are sized in the range of about 35 um to about 50 um in length.

Suitably, steps (i) to (iv) are determined using CT scanning and/or CBCT and/or intra-oral scanning.

Suitably, the shape of the portions of the implant in steps (v) to (vii) is determined using a CAD/CAM system.

Suitably, the method comprises the further step of fabricating or producing the implant.

Suitably, the implant is fabricated or produced using additive layer manufacturing.

Suitably, the implant is fabricated or produced from Titanium powder with a grain size of less than about 7 um.

Suitably, the implant is fabricated using micro layer sintering, suitably, wherein the layer thickness during micro layer sintering is less than 6 um.

In another aspect, there is disclosed a method of configuring the implant described herein comprising: (i) determining the mandibular bone size and shape around a natural tooth in situ or a natural void in situ in which a natural tooth has previously been present; (ii) determining one or more anatomical structures around the natural tooth or the natural void, said anatomical structures selected from the group consisting of blood vessels, nerves, roots and the position of adjoining teeth or a combination of two or more thereof; (iii) determining the mandibular bone mineral density and/or the mandibular bone quality around the natural tooth in situ or the natural void in situ; and (iv) using the results obtained in steps (i) to (iii) to configure the size, shape and conformal microscale cell structure of the portion adapted to abut bone, suitably, the longitudinally extending distal portion; wherein steps (i) to (iii) are performed in any order. In another aspect, there is disclosed a method of configuring an implant described herein comprising: (i) determining the marginal soft tissue thickness around the natural tooth in situ or the natural void in situ to determine the quantity of collagen fibers therein; and (ii) using the results obtained in step (i) to configure the size, shape and microhole structure of the portion adapted to abut marginal soft tissue, suitably the transmucosal portion.

In another aspect, there is disclosed a method of configuring an implant comprising: (i) determining the mandibular bone size and shape around a natural tooth in situ or a natural void in situ in which a natural tooth has previously been present; (ii) determining one or more anatomical structures around the natural tooth or the natural void, said anatomical structures selected from the group consisting of blood vessels, nerves, roots and the position of adjoining teeth or a combination of two or more thereof; (iii) determining the mandibular bone mineral density and/or the mandibular bone quality around the natural tooth in situ or the natural void in situ; (iv) determining the marginal soft tissue thickness around the natural tooth in situ or the natural void in situ to determine the quantity of collagen fibers therein; (v) using the results obtained in steps (i) to (iii) to configure the size, shape and conformal microscale cell structure of the portion adapted to abut bone, suitably, the longitudinally extending distal portion; and (vi) using the results obtained in step (i) to configure the size, shape and microhole structure of the portion adapted to abut marginal soft tissue, suitably the transmucosal portion.

In another aspect, there is disclosed an implant obtained or obtainable by the methods described herein In another aspect, there is disclosed a method of fitting an implant in a human or animal subject comprising contacting a void or bore of a human or animal subject with the implant described herein, suitably, wherein the void is in the mouth of the human or animal subject.

In another aspect, there is disclosed a method of fitting an implant in a human or animal subject comprising: (i) identifying a void or bore in bone into which an implant is to be inserted; (ii) shaping the void or the bore in the bone to accommodate the shape of all or a portion of the implant; and (iii) inserting an implant into the void or bore.

Suitably, the void was previously occupied by bone or tooth.

Suitably, the bore is created or modified in the human or animal subject by drilling bone.

Suitably, the void is shaped using piezo or laser.

Suitably, the method further comprises attaching a prosthesis to the implant.

Suitably, the implant is the implant described herein.

Suitably, there is disclosed a method of configuring an implant comprising: (i) providing a digital data set from a subject into which an implant is to be inserted, said digital data set comprising information on: the mandibular bone size and shape around a natural tooth in situ or a natural void in situ in which a natural tooth has previously been present; one or more anatomical structures around the natural tooth or the natural void, said anatomical structures selected from the group consisting of blood vessels, nerves, roots and the position of adjoining teeth or a combination of two or more thereof; the mandibular bone mineral density and/or the mandibular bone quality around the natural tooth in situ or the natural void in situ; and the marginal soft tissue thickness around the natural tooth in situ or the natural void in situ to determine the quantity of collagen fibers therein; and (ii) configuring an implant based on the digital data set obtained in step (i).

Suitably, step (ii) comprises configuring the size, shape, conformal microscale cell structure and microhole structure of the implant based on the digital data set obtained in step (i).

Suitably, the method further comprises designing a longitudinally extending distal portion, an adjoining region positioned at the proximal end of the longitudinally extending distal portion, a transmucosal portion positioned at the proximal end of the adjoining region and an abutment portion positioned at the proximal end of the transmucosal portion of an implant based on the digital data set obtained in step (i).

In another aspect, there is disclosed a method of designing an implant comprising: (i) providing a digital data set from a subject into which an implant is to be inserted, said digital data set comprising information on: the mandibular bone size and shape around a natural tooth in situ or a natural void in situ in which a natural tooth has previously been present; one or more anatomical structures around the natural tooth or the natural void, said anatomical structures selected from the group consisting of blood vessels, nerves, roots and the position of adjoining teeth or a combination of two or more thereof; and the mandibular bone mineral density and/or the mandibular bone quality around the natural tooth in situ or the natural void in situ; and (ii) configuring an implant based on the digital data set obtained in step (i).

Suitably, step (ii) comprises configuring the size, shape and conformal microscale cell structure based on the digital data set obtained in step (i).

Suitably, the method further comprises designing a longitudinally extending distal portion, an adjoining region positioned at the proximal end of the longitudinally extending distal portion and an abutment portion of an implant based on the digital data set obtained in step (i).

In another aspect, there is disclosed a method of configuring an implant comprising: (i) providing a digital data set from a subject into which an implant is to be inserted, said digital data set comprising information on: the mandibular bone size and shape around a natural tooth in situ or a natural void in situ in which a natural tooth has previously been present; one or more anatomical structures around the natural tooth or the natural void, said anatomical structures selected from the group consisting of blood vessels, nerves, roots and the position of adjoining teeth or a combination of two or more thereof; and the marginal soft tissue thickness and the around the natural tooth in situ or the natural void in situ to determine the quantity of collagen fibers therein; and (ii) configuring an implant based on the digital data set obtained in step (i).

Suitably, step (ii) comprises configuring the size, shape and micro hole structure of the implant based on the digital data set obtained in step (i).

Suitably, the method further comprises designing a portion of an implant that abuts marginal soft tissue, suitably the transmucosal portion, based on the digital data set obtained in step (i).

Suitably, one or more 3D images or one or more 2D images are recorded.

Suitably, the digital data set is used to construct an implant processing tool adapted to the implant to be implanted, suitably wherein the implant processing tool is selected from a positioning jig or a press fit tool for press fit insertion of the implant or an ultrasonic surgery instrument for laser cutting requiring a positioning jig.

Suitably, the digital data set is obtained using CT scanning and/or CBCT scanning and/or intra-oral scanning.

Suitably, the digital data set is in the DICOM and/or .STL format.

Suitably, the method further comprises the additional step of fabricating or producing the implant.

In another aspect, there is disclosed an implant obtained or obtainable by the methods described herein.

In another aspect, there is disclosed an implantation set comprising the implant described herein and at least one implant processing tool which is adapted in shape to the implant to be implanted, suitably wherein the implant processing tool is selected from a positioning jig or a press fit tool for press fit insertion of the implant or an ultrasonic surgery instrument for laser cutting requiring a positioning jig.

In another aspect, there is disclosed a method of selecting the configuration of an implant comprising a conformal microscale cell structure for a subject comprising: (i) determining the mandibular bone mineral density and/or the mandibular bone quality around the natural tooth in situ or the natural void in situ of the subject; and (ii) based on the result in step (i) configuring a bone engaging portion of the implant for the subject, wherein if the bone mineral density in the subject is 1 then the cells in the conformal microscale cell structure of the implant are sized in the range of about 25 um to about 50 um in length; or if the bone mineral density in the subject is 2 then the cells in the conformal microscale cell structure of the implant are sized in the range of about 28 um to about 50 um in length; or if the bone mineral density in the subject is 3 then the cells in the conformal microscale cell structure of the implant are sized in the range of about 30 um to about 50 um in length; or if the bone mineral density in the subject is 4 then the cells in the conformal microscale cell structure of the bone engaging portion are sized in the range of about 35 um to about 50 um in length.

In another aspect, there is disclosed a method of selecting the configuration of an implant comprising a conformal microscale cell structure for a subject comprising: (i) providing a digital data set from the subject comprising information on the mandibular bone mineral density and/or the mandibular bone quality around the natural tooth in situ or the natural void in situ of the subject; and (ii) based on the information in step (i) configuring a bone engaging portion of the implant, wherein if the bone mineral density in the subject is 1 then the cells in the conformal microscale cell structure of the implant are sized in the range of about 25 um to about 50 um in length; or if the bone mineral density in the subject is 2 then the cells in the conformal microscale cell structure of the implant are sized in the range of about 28 um to about 50 um in length; or if the bone mineral density in the subject is 3 then the cells in the conformal microscale cell structure of the implant are sized in the range of about 30 um to about 50 um in length; or if the bone mineral density in the subject is 4 then the cells in the conformal microscale cell structure of the bone engaging portion are sized in the range of about 35 um to about 50 um in length.

In another aspect, there is disclosed a method of selecting the configuration of an implant comprising micro holes for a subject comprising: (i) determining the marginal soft tissue thickness around the natural tooth in situ or the natural void in situ to determine the quantity of collagen fibers therein; and (ii) based on the information in step (i) configuring a transmucosal portion of the implant, wherein if the marginal soft tissue in the subject has a thickness of between about 0.6 mm to 0.7 mm the implant is designed to comprise at least 4 layers of micro holes in a transmucosal portion of the implant, each layer comprising at least about 50 micro holes; if the marginal soft tissue has a thickness of between about 0.9 mm to 1.0 mm the transmucosal portion is configured to comprise at least about 6 layers of micro holes, each layer comprising at least about 50 micro holes; or if the marginal soft tissue in the subject has a thickness of between about 1.3 mm to about 1.5 mm the transmucosal portion comprises at least 8 layers of micro holes, each layer comprising at least about 50 micro holes. In another aspect, there is disclosed a method of selecting the configuration of an implant comprising micro holes for a subject comprising: (i) providing a digital data set from the subject comprising information on the marginal soft tissue thickness around the natural tooth in situ or the natural void in situ to determine the quantity of collagen fibers therein; and (ii) based on the result in step (i) configuring the implant for the subject, wherein if the marginal soft tissue in the subject has a thickness of between about 0.6 mm to 0.7 mm the implant is designed to comprise at least 4 layers of micro holes in a transmucosal portion of the implant, each layer comprising at least about 50 micro holes; if the marginal soft tissue has a thickness of between about 0.9 mm to 1.0 mm the transmucosal portion is configured to comprise at least about 6 layers of micro holes, each layer comprising at least about 50 micro holes; or if the marginal soft tissue in the subject has a thickness of between about 1.3 mm to about 1.5 mm the transmucosal portion comprises at least 8 layers of micro holes, each layer comprising at least about 50 micro holes.

Suitably, the method comprises the further steps of designing and producing the implant.

Suitably, the method comprises the further step of inserting the implant into the subject.

In another aspect, there is disclosed a method of producing an implant comprising the use of a conformal microscale cell structure.

In another aspect, there is disclosed the use of a conformal microscale cell structure for producing an implant.

In another aspect, there is disclosed a method of producing an implant comprising incorporating a plurality of micro holes into a portion of the implant that abuts marginal soft tissue, suitably a transmucosal portion.

Suitably, the cross sectional area of the proximal end of the longitudinally extending distal portion is less than the cross sectional area of the proximal end of the adjoining region.

Suitably, the adjoining region transitions outwardly from its distal end towards its proximal end.

Suitably, the cross sectional area of the proximal end of the longitudinally extending distal portion is less than the cross sectional area of the distal end and the proximal end of the adjoining region.

Suitably, the adjoining region is a shoulder, suitably, wherein one or more corners of the shoulder are non-angular, suitably wherein the one or more corners of the shoulder are rounded.

Suitably, there is a lofted transition between the proximal end of the longitudinally extending distal portion and the distal end of the adjoining region.

Suitably, the cross sectional area of the distal end and/or the proximal end of the adjoining region corresponds to the cross sectional area between adjoining soft tissue of a subject which abuts bone, suitably wherein the long axis width of the distal end and/or the proximal end of the adjoining region is about 5 to 15 millimetres greater than the long axis width of the proximal end of the longitudinally extending distal portion.

Suitably, the longitudinally extending distal portion is substantially cylindrical in shape.

Suitably, the longitudinally extending distal portion is rounded at the distal end.

Suitably, the shape of the substantially cylindrical part and the shape of the adjoining region correspond to the shape of adjoining bone of a subject into which the implant is to be fitted, suitably, wherein there is no intervening space between the adjoining bone and the outer surfaces of the substantially cylindrical part and the adjoining region when the implant is fitted. Suitably, the bone engaging portion is a press-fit or a frictional fit or an interference fit with bone into which the implant is inserted.

Suitably, the transmucosal portion comprises an inwardly narrowed part, suitably, wherein the transmucosal portion has a non-circular cross section, suitably wherein the non-circular cross section is an oval cross section.

Suitably, the adjoining region narrows from the distal end in the proximal direction towards its middle and then widens in the proximal direction.

Suitably, the cross sectional area of the inwardly narrowed part corresponds to the cross sectional area between adjoining soft tissues of a subject into which the implant is to be fitted.

Suitably, the transmucosal portion is platform shifted, suitably wherein the cross sectional area of the distal end of the transmucosal portion is less than the cross sectional area of the proximal end of the adjoining region.

Suitably, the abutment portion is adapted to support a prosthesis at its distal end, suitably, wherein the abutment portion has a non-circular cross section, suitably wherein the non-circular cross section is an oval cross section.

Suitably, the implant further comprises a prosthesis reversibly or non-reversibly engaged with the abutment portion, suitably, wherein the prosthesis is a dental crown.

Suitably, when the implant is fitted, there is no intervening space between the surface of the bone engaging portion and the in situ void.

Suitably, the longitudinal height of the longitudinally extending distal portion is between about 3 to 6 millimetres; the longitudinal height of the adjoining region is between about 2 to 5 millimetres in height; the longitudinal height of the transmucosal portion is between about 3 millimetres in height; and the longitudinal height of the abutment portion is between about 5 to 7 millimetres in height.

Suitably, the implant is a 3D printed implant, suitably, a 3D metal printed implant.

Suitably, the adjoining region and the abutment portion have a first exterior surface that is compatible with soft tissue, suitably soft tissue in the mouth of a subject.

Suitably, the bone engaging portion has a second exterior surface adapted to facilitate or improve osseo-integration with bone.

Suitably, the first exterior surface is different to the second exterior surface.

Suitably, the entire adjoining region and the entire abutment portion is fabricated exclusively from the same material, suitably, wherein the entire adjoining region and the entire abutment portion is fabricated exclusively from one material, suitably, wherein the material is titanium.

Suitably, wherein the bone engaging portion is fabricated exclusively from the same material, suitably, wherein the bone engaging portion is fabricated exclusively from one material, suitably, wherein the material is metal, suitably, titanium.

Suitably, the implant is fabricated entirely from metal, suitably, titanium.

Suitably, the bone engaging portion comprises a non-biological coating that facilitates or improves osseointegration with bone.

Suitably, the non-biological coating comprises or consists of magnesium and/or calcium and/or hydroxyapatite and/or brushite.

Suitably, a prosthesis—such as a dental crown—is attached or reversibly attached to the abutment portion.

Suitably, the bone engaging portion is adapted to engage natural bone or artificial bone or a combination thereof.

Suitably, the bone engaging portion is a customised bone engaging portion, suitably, a digitally customised bone engaging portion; and/or the implant as described herein, wherein the transmucosal portion is a customised transmucosal portion, suitably, a digitally customised transmucosal portion; and/or the implant as described herein, wherein the abutment portion is a customised abutment portion, suitably, a digitally customised abutment portion.

Suitably, the implant is a customised implant, suitably a digitally customised implant.

Suitably, the implant is a dental implant.

Suitably, the bone engaging portion contains a hole at the distal end that is transverse to the longitudinal axis of the implant to facilitate or improve osseointegration with bone.

There is also described an implant which can offer increased resistance to twisting or rotation during use. In certain embodiments, the implant can allow for immediate or very early loading. In certain embodiments, the implant can increase long-term stability due to improved osseointegration. In certain embodiments, the implant can offer increased precision of fit and can benefit from lower levels of implant rejection. The implant is particularly suitable for human or animal subjects that have anatomical barriers—such as limited jawbone height—as the use of the implant can avoid the complexities and cost of bone grafting or surgery and the like. If the implant is a dental implant then it is applicable for use in human or animal subjects in which a tooth is to be replaced or in human or animal subjects that have a void that requires the placement of a tooth. According to certain embodiments, the implant is a patient customised or individualised implant. According to certain embodiments, the implant is a patient customised digital additive layer manufactured implant that is custom manufactured to a subject's specific anatomical and clinical requirements.

There is also described an implant comprising a bone engaging portion positioned at the distal end of the implant, said bone engaging portion comprising: a longitudinally extending distal portion; and an adjoining region positioned at the proximal end of the longitudinally extending distal portion, wherein the cross sectional area of the proximal end of the longitudinally extending distal portion is less than the cross sectional area of the distal end and/or the proximal end of the adjoining region; and wherein the longitudinally extending distal portion has a circular cross section, and wherein the adjoining region has a non-circular cross section.

Suitably, the non-circular cross section is an oval cross section. Suitably, the non-circular cross section of the adjoining region resembles, matches or corresponds exactly to the former in situ tooth cross section. Suitably, the shape and dimensions of the adjoining region resembles, matches or corresponds exactly to the shape and dimensions of the corresponding part of the former in situ tooth.

Suitably, the cross sectional area of the proximal end of the longitudinally extending distal portion is less than the cross sectional area of the proximal end of the adjoining region.

Suitably, the adjoining region transitions outwardly from its distal end towards its proximal end.

Suitably, the cross sectional area of the proximal end of the longitudinally extending distal portion is less than the cross sectional area of the distal end and the proximal end of the adjoining region.

Suitably, the adjoining region is a shoulder, suitably, wherein one or more corners of the shoulder are non-angular, suitably wherein the one or more corners of the shoulder are rounded.

Suitably, there is a lofted transition between the proximal end of the longitudinally extending distal portion and the distal end of the adjoining region.

Suitably, the cross sectional area of the distal end and/or the proximal end of the adjoining region corresponds to the cross sectional area between adjoining soft tissue of a subject which abuts bone, suitably wherein the long axis width of the distal end and/or the proximal end of the adjoining region is about 5 to 15 millimetres greater than the long axis width of the proximal end of the longitudinally extending distal portion.

Suitably, the longitudinally extending distal portion is substantially cylindrical in shape.

Suitably, the longitudinally extending distal portion is rounded at the distal end.

Suitably, the shape of the substantially cylindrical part and the shape of the adjoining region correspond to the shape of adjoining bone of a subject into which the implant is to be fitted, suitably, wherein there is no intervening space between the adjoining bone and the outer surfaces of the substantially cylindrical part and the adjoining region when the implant is fitted. Suitably, the bone engaging portion is a press-fit or a frictional fit or an interference fit with bone into which the implant is inserted.

Suitably, the implant further comprises a transmucosal portion positioned at the proximal end of the adjoining region and comprising an inwardly narrowed part, suitably, wherein the transmucosal portion has a non-circular cross section, suitably wherein the non-circular cross section is an oval cross section.

Suitably, the adjoining region narrows from the distal end in the proximal direction towards its middle and then widens in the proximal direction.

Suitably, the cross sectional area of the inwardly narrowed part corresponds to the cross sectional area between adjoining soft tissues of a subject into which the implant is to be fitted.

Suitably, the transmucosal portion is platform shifted, suitably wherein the cross sectional area of the distal end of the transmucosal portion is less than the cross sectional area of the proximal end of the adjoining region.

Suitably, the implant further comprises an abutment portion positioned at the proximal end of the transmucosal portion, wherein said abutment portion is adapted to support a prosthesis at its distal end, suitably, wherein the abutment portion has a non-circular cross section, suitably wherein the non-circular cross section is an oval cross section.

Suitably, the implant further comprises a prosthesis reversibly or non-reversibly engaged with the abutment portion, suitably, wherein the prosthesis is a dental crown.

Suitably, the implant is a two piece implant in which the bone engaging portion forms one piece of the implant and the transmucosal portion, optionally together with the abutment portion, forms the other piece of the implant, suitably wherein the pieces of the implant are reversibly attached to each other, suitably wherein the pieces of the implant are screwed to each other.

Suitably, the implant is a one-piece implant.

Suitably, the shape and size of the bone engaging portion corresponds to the shape and size of the in situ void into which the implant is to be inserted such that, when the implant is fitted, there is no intervening space between the surface of the bone engaging portion and the in situ void.

Suitably, the longitudinal height of the longitudinally extending distal portion is between about 3 to 6 millimetres; the longitudinal height of the adjoining region is between about 2 to 5 millimetres in height; the longitudinal height of the transmucosal portion is between about 3 millimetres in height; and the longitudinal height of the abutment portion is between about 5 to 7 millimetres in height.

Suitably, the implant is a 3D printed implant, suitably, a 3D metal printed implant or a 3D plastic printed implant.

Suitably, the adjoining region and the abutment portion have a first exterior surface that is compatible with soft tissue, suitably soft tissue in the mouth of a subject.

Suitably, the bone engaging portion has a second exterior surface adapted to facilitate or improve osseo-integration with bone.

Suitably, the first exterior surface is different to the second exterior surface.

Suitably, at least the exterior surface or a portion of the exterior surface of the adjoining region and the abutment portion is non-porous. In one embodiment the entire exterior surface of the adjoining region and the abutment portion is non-porous, suitably, wherein the entire adjoining region and the entire abutment portion is non-porous.

In another embodiment, the surface finish of the adjoining region is divided into at least two different surface finishes—such as a polished (mirrored) and a porous surface. Suitably, the entire adjoining region and the entire abutment portion is fabricated exclusively from the same material, suitably, wherein the entire adjoining region and the entire abutment portion is fabricated exclusively from one material, suitably, wherein the material is titanium or zirconium oxide or polyether ether ketone (PEEK) or Polyetherketoneketone (PEKK).

Suitably, at least the exterior surface of the bone engaging portion is porous or rough (for example, etched or sandblasted), suitably, wherein the entire exterior surface of the bone engaging portion is porous or rough (for example, etched or sandblasted), suitably, wherein the entire bone engaging portion is porous or rough (for example, etched or sandblasted).

Suitably, the porosity or roughness of the bone engaging portion decreases towards the transmucosal portion.

Suitably, the porosity or roughness of the longitudinally extending distal portion and the adjoining region is the same or different.

Suitably, the bone engaging portion comprises pores.

Suitably, the bone engaging portion comprises a gradation of pore sizes, suitably, wherein the pore size decreases towards the transmucosal portion.

Suitably, the pores form a network of channels through the exterior surface of the bone engaging portion such that, in use, bone grows into the exterior surface of the bone engaging portion, or wherein the pores form a network of channels through the entirety of the bone engaging portion, such that, in use, bone can grow into the bone engaging portion.

Suitably, wherein the bone engaging portion is fabricated exclusively from the same material, suitably, wherein the bone engaging portion is fabricated exclusively from one material, suitably, wherein the material is titanium or zirconium oxide or polyether ether ketone (PEEK) or Polyetherketoneketone (PEKK).

Suitably, two or more of the longitudinally extending distal portion and/or the adjoining region and/or the transmucosal portion and/or the abutment portion are fabricated exclusively from the same material, suitably, fabricated exclusively from one material, suitably, wherein the material is titanium or zirconium oxide or polyether ether ketone (PEEK) or Polyetherketoneketone (PEKK).

Suitably, the implant is fabricated from titanium or zirconium oxide, suitably, wherein the implant is fabricated exclusively from titanium or zirconium oxide or polyether ether ketone (PEEK) or Polyetherketoneketone (PEKK).

Suitably, the exterior surface of the abutment portion and/or the transmucosal portion is a polished surface.

Suitably, at least the exterior surface of the bone engaging portion has an interlaced appearance or a meshed appearance or is a roughened surface.

Suitably, the bone engaging portion comprises a coating to further facilitate or improve osseointegration with bone.

Suitably, the coating is a non-biological coating.

Suitably, the non-biological coating comprises or consists of magnesium and/or calcium and/or hydroxyapatite and/or brushite.

Suitably, a prosthesis—such as a dental crown—is attached or reversibly attached to the abutment portion.

Suitably, the bone engaging portion is adapted to engage natural bone or artificial bone or a combination thereof.

Suitably, the bone engaging portion is a customised bone engaging portion, suitably, a digitally customised bone engaging portion; and/or the implant as described herein, wherein the transmucosal portion is a customised transmucosal portion, suitably, a digitally customised transmucosal portion; and/or the implant as described herein, wherein the abutment portion is a customised abutment portion, suitably, a digitally customised abutment portion.

Suitably, the implant is a customised implant, suitably a digitally customised implant.

Suitably, the implant is a dental implant.

Suitably, wherein the bone engaging portion contains a hole at the distal end that is transverse to the longitudinal axis of the implant to facilitate or improve osseointegration with bone.

There is also described a method of manufacturing an implant comprising: (i) digitally imaging the shape of a natural tooth in situ or a natural void in situ in which a natural tooth has previously been present and/or digitally imaging a bone in situ and/or digitally imaging soft tissue in situ adjacent to bone; (ii) using the digital imaging data obtained in step (i) to fabricate the implant; and (iii) obtaining an implant.

Suitably, the shape of the natural tooth in situ or the natural void in situ and/or the bone in situ is imaged using CT scanning.

Suitably, the shape of the soft tissue in situ is imaged using intra-oral scanning.

Suitably, the implant is fabricated using 3D printing, suitably, 3D metal printing or 3D plastic printing.

There is also described an implant obtained or obtainable by the method(s) described herein. There is also described a method of fitting an implant in a human or animal subject comprising contacting a void of a human or animal subject with the implant 30, suitably, wherein the void is in the mouth of the human or animal subject.

Suitably, the void was previously occupied by bone or tooth.

Suitably, the void is created or modified in the human or animal subject by drilling bone.

Suitably, following the drilling of bone, the void is shaped to match the shape of all or a portion of the bone engaging portion of the implant.

Suitably, the void is shaped to match the shape of at least the adjoining region 51 of the implant.

Suitably, the void is shaped using piezo or laser.

Suitably, the method further comprises attaching a prosthesis—such as a dental crown—to the abutment portion of the implant.

Suitably, the tooth is extracted from the human or animal subject to create a void previously occupied by the tooth and the void is contacted with the implant after partial or complete healing of the void.

Suitably, the void is contacted with the implant 6 to 8 weeks after extraction of the tooth.

Suitably, the void is contacted with the implant more than 8 weeks after extraction of the tooth, suitably, between 8 and 12 weeks after extraction of the tooth.

BRIEF DESCRIPTION OF THE FIGURES

FIG. 5(*b*) illustrates an implant 30 according to another embodiment of the present disclosure in which a portion of the surface of the adjoining region 51 is the same as the surface of the transmucosal portion 43, which can serve to further limit the risk of infection.

FIG. 8(*b*) illustrates a side view of an implant 30 according to an embodiment of the present disclosure. Measurements are in mm.

FIG. 8(*c*) illustrates a 3-dimensional view of an implant 30 according to an embodiment of the present disclosure.

FIG. 8(*d*) illustrates a top view of an implant 30 according to an embodiment of the present disclosure.

FIG. 9(*b*) illustrates an implant 30 according to an embodiment of the present disclosure in which the longitudinally extending distal portion 34 comprises a screw thread 72 and the exterior surface of the transmucosal portion 43 comprises a plurality of micro holes 86, which are further illustrated in FIG. 11.

FIG. 10(*b*) illustrates a bottom view of the longitudinally extending distal portion 34 comprising openings 94 in the conformal microscale cell structure 94. The drawing is not to scale.

DETAILED DESCRIPTION

Figure 1:
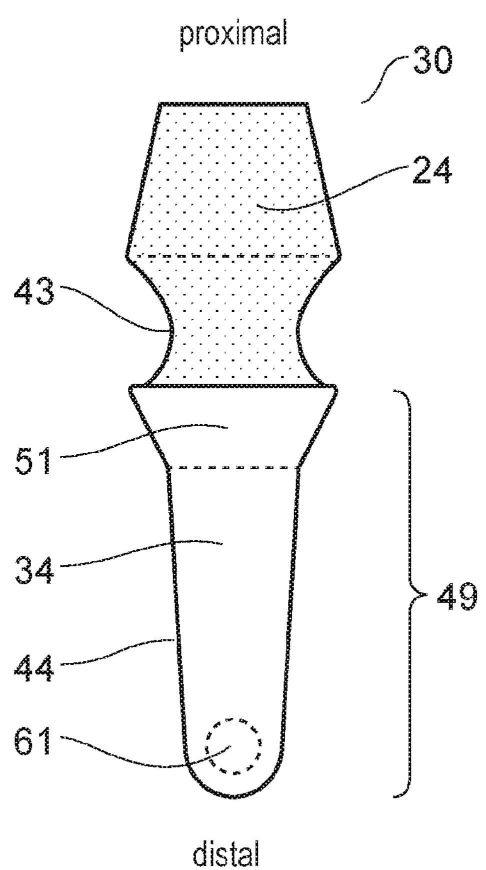
FIG. 1 illustrates an implant 30 according to one embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilised, and other changes may be made, without departing from the spirit or scope of the subject matter presented herein. In the drawings, and in the following description, the term "proximal" should be understood as referring to the end of the implant 30 that is closer to the clinician or dentist during proper use, while the term "distal" should be understood as referring to the end of the implant that is furthest from the clinician or dentist during proper use. The proximal end is generally orientated towards soft tissue (for example, the gum). The distal end is generally orientated towards bone.

As used herein, the singular forms "a", "an", and "the" include both singular and plural referents unless the context clearly dictates otherwise.

The term "and/or" means (a) or (b) or both (a) and (b).

The terms "comprising", "comprises" and "comprised of" as used herein are synonymous with "including", "includes" or "containing", "contains", and are inclusive or open-ended and do not exclude additional, non-recited members, elements or method steps. The term "consisting of" means that additional components are excluded and has the recited elements only and no more.

The recitation of numerical ranges by endpoints includes all numbers and fractions subsumed within the respective ranges, as well as the recited endpoints.

The term "about" as used herein when referring to a measurable value such as a parameter, an amount, and the like, is meant to encompass variations of and from the specified value, in particular variations of +/−10% or less, preferably +/−5% or less, more preferably +/−1% or less, and still more preferably +/−0.1% or less of and from the specified value, insofar such variations are appropriate to perform in the disclosure. It is to be understood that the value to which the modifier "about" refers is itself also specifically, and preferably, disclosed.

Whereas the term "one or more", such as one or more members of a group of members, is clear per se, by means of further exemplification, the term encompasses inter alia a reference to any one of said members, or to any two or more of said members, such as, e.g., any or etc. of said members, and up to all said members.

For the avoidance of doubt, "um" has the same meaning as "μm".

Implant

In one aspect, there is described an implant 30 comprising a bone engaging portion 49 positioned at the distal end of the implant 30, said bone engaging portion 49 comprising: a longitudinally extending distal portion 34; and an adjoining region 51 positioned at the proximal end of the longitudinally extending distal portion 34.

In certain embodiments, the cross sectional area of the proximal end of the longitudinally extending distal portion 34 can be less than the cross sectional area of the distal end and/or the proximal end of the adjoining region 51. The longitudinally extending distal portion 34 can have or comprise a circular cross section. The adjoining region 51 can have or comprise a non-circular cross section, suitably an oval cross section. This can be appreciated from FIG. 2.

The implant 30 can comprise a bone engaging portion 49 positioned at the distal end of the implant 30. The implant 30 can comprise a transmucosal portion 43. The implant 30 can comprise an abutment portion 24 optionally joined to the transmucosal portion 43. The implant can comprise a prosthesis joined to the abutment portion 24.

The implant 30 can comprise a bone engaging portion 49 positioned at the distal end of the implant 30. The implant 30 can further comprise a transmucosal portion 43. The implant 30 can further comprise an abutment portion 24 joined to the transmucosal portion 43. The implant can further comprise a prosthesis joined to the abutment portion 24.

Various combinations of the individual portions of the implant 30 are contemplated herein. For example, the implant 30 can comprise the bone engaging portion 49 and the transmucosal portion 43. By way of further example, the implant 30 can comprise the bone engaging portion 49 and the abutment portion 24. By way of further example, the implant 30 can comprise the bone engaging portion 49 and the abutment portion 24 and prosthesis joined to the abutment portion 24.

The implant 30 can be a one-piece integrally formed implant. According to this embodiment, the various portions of the implant 30 are produced together as a single component piece without any form of engagement or fixing between the portions.

In another embodiment, the implant 30 is a two piece or three piece or four piece dental implant or a modular implant. According to this embodiment, the various two or more portions of the implant 30 are separately manufactured and then engaged or fixed together, for example, by screwing or cementing them together. The engagement or fixing between the various two or more portions can be reversible or non-reversible. In one exemplary embodiment, the abutment portion 24 is fixed to the bone engaging portion 49 by a screw 72. The screw 72 can be part of the abutment portion 24 which fixes in to the bone engaging portion 49. The screw 72 can be part of the bone engaging portion 49 which fixes in to the abutment portion 24.

The implant 30 can be (entirely) made of a suitable biocompatible material, such as titanium. In certain embodiments, it may also be made of other biocompatible materials such as at least one of the following: zirconium oxide, polyaryl ether ketone (PAEK)—such as polyether ketone ketone (PEKK), polyether ether ketone (PEEK), polyether ketone ether ketone ketone (PEKEKK), polymethylmethacrylate (PMMA), polyetherimide, polysulfone or polyphenylsulfone.

In certain embodiments, the different portions of the implant can be made from the same biocompatible material or different biocompatible materials. The different portions of the implant can be made from the same biocompatible material or different biocompatible materials that have a different surface finish. When the same biocompatible material is used, one portion of the implant can be made of a first biocompatible material and the other portion of the implant can be made from the same first biocompatible material. When the same biocompatible material is used, one portion of the implant can be made exclusively of a first biocompatible material and the other portion of the implant can be made exclusively from the same first biocompatible material. When different biocompatible materials are used, one portion of the implant can be made of a first biocompatible material and the other portion(s) of the implant can be made from a second, different biocompatible material(s). When different biocompatible materials are used, one portion of the implant can be made exclusively of a first biocompatible material and the other portion(s) of the implant can be made exclusively from a second, different biocompatible material (s). Alternatively, one portion of the implant can be made exclusively of a first biocompatible material and the other portion of the implant can be made exclusively from the same first biocompatible material.

The use of different combinations of biocompatible materials to manufacture the implant 30 or one or more portions thereof is contemplated. The use of different combinations of biocompatible materials to manufacture two or more or three or more of four or more portions of the implant 30 is contemplated.

Whilst the implant 30 described herein can be manufactured for use in various purposes as described herein, a preferred embodiment relates to a dental implant. The goal of a dental implant is to restore the human or animal subject to normal function, comfort, aesthetic, speech and health regardless of the current oral condition. A dental implant can allow a prosthesis—such as a dental crown—to be securely anchored to the bone. A good fit of the dental implant is of the highest importance to reduce mechanical stress and enable good function and comfort for the human or animal subject following implantation.

In one embodiment, the implant has a press-fit or a screw fit.

In other embodiments, the implant has a frictional fit or an interference fit with bone into which the implant 30 is inserted. This can provide primary stability and resistance to pull out the implant 30. This kind of fit can have certain advantages over a screw or blade fit as it can cause less trauma to bone, which could otherwise lead to extended healing and recovery times following implantation.

Each part of the implant can be shaped to fit the subject into which it is to be inserted.

Other aspects relate to implant 30 comprising a portion adapted to abut bone, suitably a longitudinally extending distal portion, wherein the exterior surface of the portion adapted to engage bone comprises a conformal microscale cell structure.

Other aspects relate to implant 30 comprising a portion adapted to abut marginal soft tissue, suitably a transmucosal portion adapted to engage marginal soft tissue, wherein the portion adapted to abut or engage marginal soft tissue comprises a plurality of micro holes in the external surface thereof.

Other aspects relate to implant 30 comprising the portion adapted to engage bone and the portion adapted to engage marginal soft tissue. Suitably, this implant further comprises: (a) an adjoining region 51 positioned at the proximal end of the portion adapted to engage bone, suitably, the longitudinally extending distal portion 34; and an abutment portion 24 positioned at the proximal end of the portion adapted to engage marginal soft tissue, suitably the transmucosal portion 43.

Bone Engaging Portion

A bone engaging portion of an implant is described. The bone engaging portion 49 can be positioned on a distal portion of the implant 30. The proximal end of the bone engaging portion 49 can be attached reversibly or non-reversibly to the distal end of the abutment portion 24. The bone engaging portion 49 can be configured and fitted to generally align with a void or bore in living bone—such as jaw bone (mandible and/or maxilla)—and can be configured or adapted to promote osseo-integration with bone—such as living bone. Suitably, at least part of the bone engaging portion 49 promotes osseointegration with the bone to create a structural and functional connection between the bone engaging portion 49 of the implant 30 and the bone. The bone can be naturally occurring bone or artificial bone.

The bone engaging portion 49 comprises a longitudinally extending distal portion 34. The bone engaging portion 49 can terminate in a planar surface. The bone engaging portion 49 can further comprise an adjoining region 51 positioned at the proximal end of the longitudinally extending distal portion 34.

According to one aspect, the exterior surface of the longitudinally extending distal portion 34 comprises a conformal microscale cell structure and optionally, a non-biological coating as described herein.

Figure 10:
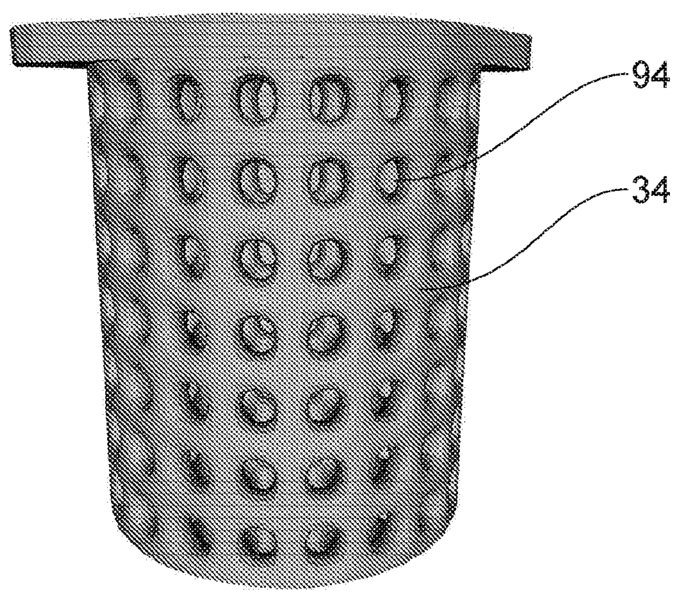
FIG. 10(*a*) illustrates a side view of the longitudinally extending distal portion 34 comprising openings 94 in the conformal microscale cell structure. The drawing is not to scale.
Figure 10:
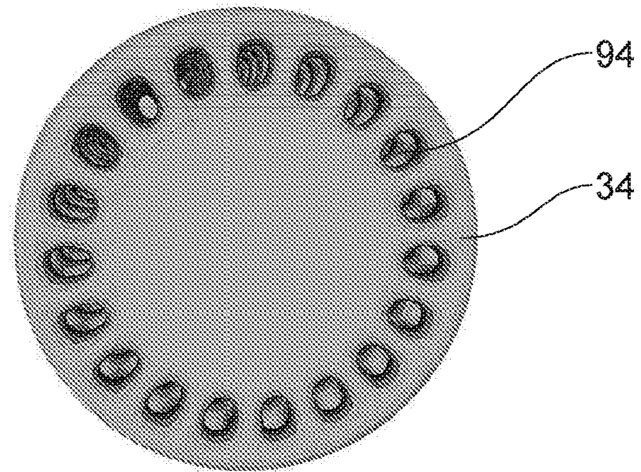

The longitudinally extending distal portion 34 can comprise a solid longitudinally extending core which extends up to about 50% of the diameter of the longitudinally extending distal portion 34. An embodiment of the longitudinally extending distal portion 34 is illustrated in FIG. 10.

The longitudinally extending distal portion 34 can be shaped as a cylinder and/or it can comprise a screw thread 72.

Advantageously, the use of a conformal microscale cell structure allows at least the exterior surface of the longitudinally extending distal portion 34 to be customised according to the bone mineral density or the bone quality of the subject into which the implant is to be inserted. This can facilitate or improve osseointegration with the surrounding mandibular bone. The conformal microscale cell structure is described further below. The cross sectional area of the proximal end of the longitudinally extending distal portion 34 can be less than the cross sectional area of the distal end and/or the proximal end of the adjoining region 51.

Figure 2:
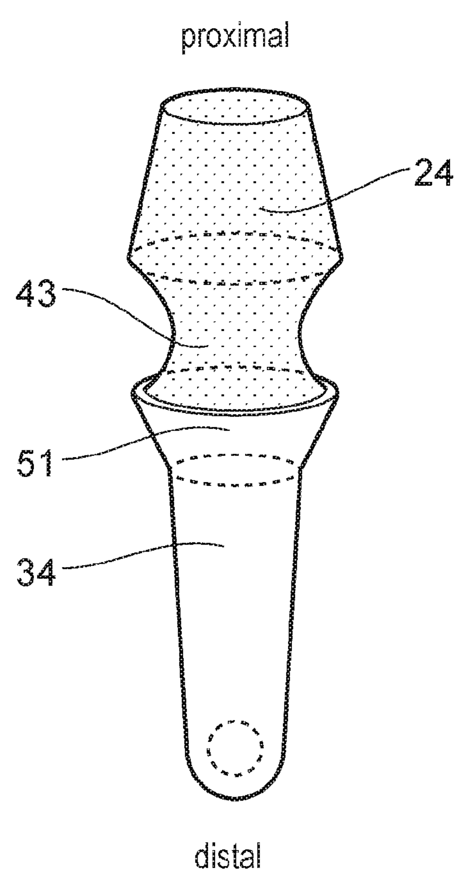
FIG. 2 illustrates a hypothetical transparent view of an implant 30 according to one embodiment of the present disclosure in which the circular cross section of the longitudinally extending distal portion 34 and the non-circular cross section of the adjoining region 51, the transmucosal portion 43 and the abutment portion 24 are shown.

The portions of the bone engaging portion 49 can have different cross sectional shapes, which can be appreciated from FIG. 2. The longitudinally extending distal portion 34 can have a circular cross section shape. The adjoining region 51 can have a non-circular cross section shape, suitably an oval cross section shape.

In certain embodiments, the longitudinally extending distal portion 34 has a maximum long axis width of between about 3 to 6 millimetres. In certain embodiments, the longitudinally extending distal portion 34 has a length of between about 3 to 6 millimetres.

In certain embodiments, the bone engaging portion 49 has maximum long axis widths of different sizes. For example, the proximal end of the longitudinally extending distal portion 34 can have a maximum long axis width of between about 3 to 6 millimetres and the proximal end of the adjoining region 51 can have a maximum long axis width of between about 5 to 12 millimetres. In certain embodiments, the bone engaging portion 49 has a length of between about 5 to 9 millimetres. Other exemplary measurements are shown in the Figures.

Suitably, the bone engaging portion 49 or portions of the bone engaging portion 49—such as the longitudinally extending distal portion 34 or the adjoining region 51—has an exterior surface finish (for example, a porous or a rough surface finish) that is different to the exterior surface finish of the transmucosal portion 43 and the abutment portion 24.

The longitudinally extending distal portion 34 of the bone engaging portion 49 can be generally or substantially cylindrical, in one form it can have a rounded distal end and a substantially flat or planar proximal end that joins to or merges with the adjoining region 51. The longitudinally extending distal portion 34 can be configured to have a proximal end with a larger cross sectional area than the distal end. This tapered structure can provide a geometry that is closer to the geometry of the natural tooth or void or bore in situ. The slope of the taper can be customised to match the slope of the void or bore in situ. The longitudinally extending distal portion 34 can be in the form of a screw 72.

Suitably, at least a portion of the exterior surface of the bone engaging portion 49 is porous in order to promote osseointegration with living bone. Suitably, the entire exterior surface of the bone engaging portion 49 is porous. Suitably, the entirety of the bone engaging portion 49 is porous. In a particular embodiment, the porosity of the bone engaging portion 49 decreases from the distal end to the proximal end of the bone engaging portion 49. In certain embodiments, this configuration can be advantageous because it can promote osseo-integration with bone at the distal end of the bone engaging portion 49 and the reduction in porosity towards the proximal end can promote soft tissue adhesion to act as a biological seal. The biological seal can act to prevent infection—such as bacterial infection.

The porosity of the longitudinally extending distal portion 34 can decrease from its distal end towards its proximal end. The porosity of the adjoining region 51 can decrease from its distal end towards its proximal end. The longitudinally extending distal portion 34 can be more porous than the adjoining region 51.

The porosity may be achieved through the use of pores, which can be constantly sized pores or a gradation of pore sizes. The pores can be created via the nanostructures produced during a manufacturing process of laser metal sintering. If constantly sized pores are present then the number of pores can decrease from the distal end to the proximal end which will act to decrease porosity from the distal end to the proximal end. If a gradation of pores sizes is used then the size of pores can decrease from the distal end towards the proximal end which will act to decrease porosity from the distal end to the proximal end. Suitably, the distal end is more porous than the proximal end of the bone engaging portion 49.

If constantly sized pores are present then the number of pores can decrease from the distal end to the proximal end of the longitudinally extending distal portion 34.

If constantly sized pores are present then the number of pores can decrease from the distal end to the proximal end of the adjoining region 51.

If a gradation of pores sizes is present then the size of pores can decrease from the distal end towards the proximal end of the longitudinally extending distal portion 34.

If a gradation of pores sizes is present then the size of pores can decrease from the distal end towards the proximal end of the adjoining region 51.

Suitably, the distal end of the longitudinally extending distal portion 34 is more porous than the proximal end of the longitudinally extending distal portion 34.

Suitably, the distal end of the adjoining region 51 is more porous than the proximal end of the adjoining region 51.

The pores that can be present in the bone engaging portion 49 or a part thereof (for example, the longitudinally extending distal portion 34 or the adjoining region 51) can form a network of channels through the exterior surface of the bone engaging portion 49 or the part thereof such that, in use, bone can grow into the exterior surface of the bone engaging portion 49 or the part thereof. The pores that can be present in the bone engaging portion 49 or the part thereof can form a network of channels through the entirety of the bone engaging portion 49, such that, in use, bone can grow into the bone engaging portion 49 of the part thereof.

Suitably, the shape of the longitudinally extending distal portion 34 corresponds in shape and size to the void or bore into which it is to be inserted, for example, into the maxilla bone or the mandibular bone or the jawbone. Suitably, there is no intervening space between the adjoining bone and the outer surfaces of the longitudinally extending distal portion 34 once the longitudinally extending distal portion 34 is fitted into the bone. Suitably the fit between the longitudinally extending distal portion 34 and the bone is a press-fit or a frictional fit or interference fit with the bone into which the implant 30 is inserted.

Suitably, the shape of the longitudinally extending distal portion 34 can accommodate one or more anatomical obstacles in the bone of the subject.

In some instances it may be necessary to supplement bone into which the implant is to be inserted with natural bone or artificial bone or animal bone. Suitably, the animal bone is or is derived or is derivable from bovine bone or ovine bone. The artificial bone can be artificial bone particles or blocks.

Suitably, the longitudinally extending distal portion 34 has an interlaced appearance or a meshed appearance or is a porous or rough (for example, etched or sandblasted). As understood by a person skilled in the art, a rough surface is an uneven or irregular surface that is not smooth or level.

In a further embodiment, the bone engaging portion 49 comprises a coating 44 to further facilitate or improve osseointegration with bone. The coating 44 can be a non-biological coating—such as a non-biological coating comprising or consisting of magnesium and/or calcium and/or hydroxyapatite and/or brushite.

The surface of the bone engaging portion 49 can be customised to match the patient's bone volume (for example, porosity).

The bone engaging portion 49 can be 3D printed, suitably, 3D metal printed or 3D plastic printed as described herein.

In certain embodiments the bone engaging portion 49 is devoid of threads, screw threads or blades. Suitably, the surface of the bone engaging portion 49 is devoid of threads, screw threads or blades. Suitably, the longitudinally extending distal portion 34 is devoid of threads, screw threads or blades. Suitably, the surface of the longitudinally extending distal portion 34 is devoid of threads, screw threads or blades.

Suitably, the surface of the implant 30 is devoid of threads, screw threads or blades. In other embodiments, the bone engaging portion 49 comprises threads 72 or screw threads 72. Suitably, the longitudinally extending distal portion 34 is substantially cylindrical in shape. Suitably, the longitudinally extending distal portion 34 is rounded at the distal end, which can facilitate insertion of the implant into bone.

Conformal Microscale Cell Structure

As used herein, the term "conformal microscale cell structure" refers to a Conformal Lattice Structure (CLS) in which the cellular structure has a length of less than 90 um. Computer-aided design technologies can be used for efficiently generating and representing CLS. Software to achieve this is commercially available, for example, from Rhinoceros.

The concept of designed cellular materials is motivated by the desire to put material only where it is needed for a specific application. From a mechanical engineering viewpoint, a key advantage offered by cellular materials is high strength accompanied by a relatively low mass.

These materials can provide good energy absorption characteristics and good thermal insulation properties as well.

Lattice structures consist of a set of struts (beams) that connect the nodes of the lattice. Each meso-scale lattice structure design problem has its own loading condition, geometric properties and desired performance specification.

The lattice structure is formed of primitive cell types mapped into a mesh. Portions of the 3-D mesh consists of hexahedra (6-sided volume elements with planar sides), forming a hexahedral mesh where the elements are general hexahedra and conform to an outer complex or curved surface of an article.

Suitably, the cellular structure has a length of less than 50 um or less than 40 um or less than 30 um. Suitably, the cellular structure is sized in the range of about 28 um to about 40 um in length, suitably wherein the cells are sized in the range of about 28 to about 50 um in length, or about 31 and about 50 um in length, or about 36 and about 50 um in length. The conformal microscale cell structure can extend (inwardly) up to about 50% of the diameter of the implant. FIG. 10 illustrates openings 94 in the cellular structure of the conformal microscale cell structure of the longitudinally extending distal portion 34.

After designing the conformal microscale cell structure, it can be transformed into an .STL file which slices micro metrically the model into several cross sections defined as layers. Conformal microscale cell structures can be fabricated using additive manufacturing for the fabrication of customised, light-weight material. Software is generally available in the art for this process and can be integrated into a commercial CAD system, as required.

CLS design and fabrication is described in, for example, Solid freeform fabrication proceedings (2012), 138-161, Annual international solid freeform fabrication symposium, Texas, Austin.

Figure 12:
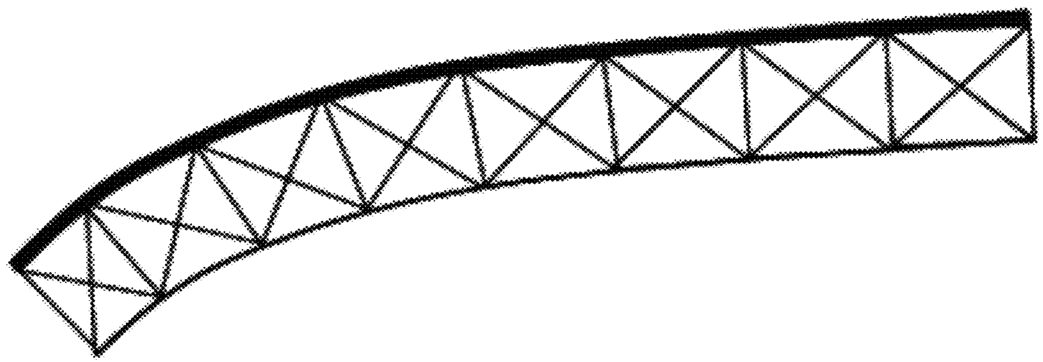
FIG. 12 is a two-dimensional illustration of a conformal lattice structure.

As described in that publication, and shown in FIG. 12, conformal cell structures refer to cellular materials that conform to the shapes of part surfaces. Cellular materials include foams, honeycombs, lattices, and similar constructions. Lattice structures consist of a set of struts (beams) that connect the nodes of the lattice and tend to have geometry variations in three dimensions. A conformal cell structure formed of individual lattice structures may be referred to as a conformal lattice structure.

In one example, the .STL file is transferred to Micro Laser Sintering (MLS) equipment. MLS combines the advantages of additive manufacturing and micrometry, enabling highly detailed resolution and surface quality. A small laser beam with a focal of below 20 um can be used together with melting micro powder which is smaller than 8 um in average grain size and applied on layers smaller than 8 um. Such technology is available from 3D Microprint.

The use of CLS for the longitudinally extending distal portion 34 is motivated by the desire to put material only where it is needed, to replicate the density of the bone to improve osseointegration and to allow coating material to facilitate or improve bone growth. From a mechanical engineering viewpoint, an advantage offered by cellular materials is high strength accompanied by a relatively low mass, form a medical point of view an advantage is to replicate the bone design and to facilitate or improve secondary binding.

It is generally preferred to use conformal cellular structures, which include cell-to-cell geometric variability between at least some of the cells, for example, as shown in FIG. 12, rather than uniform structures, in order to adapt to the geometry of the implant. As shown in FIG. 12 and the other figures, a subset of hexahedral cells includes a first hexahedral cell adjacent to a second hexahedral cell, the first hexahedral cell and the second hexahedral cell being disposed at the curved exterior surface of the longitudinally extending distal portion. The first hexahedral cell has a first geometry defined by a first set of nodes and a first set of distances between respective pairs of nodes of the first set of nodes, the first hexahedral cell having a first outer plane defined by outer nodes of the first hexahedral cell that are disposed on the exterior surface. The second hexahedral cell has a second geometry defined by a second set of nodes with a second set of distances between respective pairs of nodes of the second set of nodes. The second hexahedral cell has a second outer plane defined by outer nodes of the second hexahedral cell that are disposed on the exterior surface. Additionally, the first geometry of the first hexahedral cell is different than the second geometry of the second hexahedral cell such that the first outer plane is disposed at an angle relative to the second outer plane that matches a curvature of the curved exterior surface at the first and second hexahedral cells.

Meshes for conformal structures are general hexahedra. Software can be used for generating conformal meshes that are used to create conformal lattice and cellular structures. It is preferred that the mesh elements are cubic as an individual shape but they can also be arched and round as required. They can be of uniform thickness and uniform size. Such meshes are typically not generated by the free meshing methods in finite-element analysis codes, while typical part geometries are too complex for mapped meshing methods. The process to generate the conformal microscale cell structure for use in the present disclosure involves determining the shape and size of the bone engaging portion to generate a CAD .STL file.

The diameter is then computed with a 3D conformal mesh which can be up to 50% of the total diameter. The objective of the software is to place a conformal hexahedral mesh into which predefined cell structures can be placed. One or more layers of cellular structure can be placed to support the skin. A conformal cellular model or lattice structure is generated.

The conformal microscale cell structure can differ according to the bone mineral density and/or the bone quality of a subject into which the longitudinally extending distal portion 34 is to be inserted. In other words, the longitudinally extending distal portion 34 can be customised according to the bone mineral density and/or the bone quality of the subject into which the longitudinally extending distal portion 34 is to be inserted. Deciphering the bone mineral density and/or the bone quality of a subject can be achieved using methods that are known in the art and discussed below. The data that is acquired via these methods can be used to alter the conformal microscale cell structure according to the patient's needs. By way of example, with a bone mineral density and/or bone quality of 1 (a very dense bone) the cell openings in the conformal microscale cell structure will be between 25 to 50 um in length. With a bone mineral density and/or bone quality of 2 (a less a dense bone) the cell openings in the conformal microscale cell structure will be between 28 to 50 um in length. With a bone mineral density and/or bone quality of 3 the cell openings in the conformal microscale cell structure will be between 31 and 50 um in length. With a bone mineral density and/or bone quality of 4, the cell openings in the conformal microscale cell structure will be between 36 and 50 um in length.

A method of producing an implant comprising the use of a conformal microscale cell structure is disclosed.

The use of a conformal microscale cell structure for producing an implant is also disclosed.

Bone Quality and Bone Mineral Density

Bone quality generally encompasses factors other than bone mineral density such as skeletal size, the architecture and 3-dimensional orientation of the trabeculae of bone, and matrix properties. Bone quality is a matter of mineral content and structure. The success rate obtained with the integration of implants typically depends on the volume and quality of the surrounding bone. In the case of dental implants the surrounding bone of interest is mandibular bone. It is desirable to understand the bone quantity and quality of the surrounding bone according to the present disclosure so that the implant can be customised to the needs of an individual subject. Bone quality is well-known to be categorized into four groups: groups 1-4 or type I to IV: Type I is homogeneous cortical bone; Type II is thick cortical bone with marrow cavity; Type III is thin cortical bone with dense trabecular bone of good strength; and Type IV is very thin cortical bone with low density trabecular bone of poor strength.

Four bone mineral density groups (1 to 4) are also well known in the art. The homogeneous, dense Group 1 bone type presents several advantages for implant dentistry. The cortical lamellar bone can heal with little interim bone formation, ensuring good bone strength while healing next to the implant. Group 2 bone is a combination of dense-to-porous cortical bone on the crest and coarse trabecular bone on the inside. The Group 2 bone trabeculae are typically 40% to 60% stronger than Group 3 bone. Group 3 bone is typically composed of thinner porous cortical bone on the crest and fine trabecular bone within the ridge. The trabecula are about 50% weaker than those in the Group 2 bone. Group 4 bone has very little density and little or no cortical crestal bone. The bone trabeculae may be up to 10 times weaker than the cortical bone of Group 1.

Bone mineral density (BMD) is generally defined as the amount of bone tissue in a certain volume of bone. Several methods are well known to measure bone density. For example, densitometric measurements of panoramic and periapical radiographs or more advanced methods—such as Dual Energy X-Ray Absorptiometry (DEXA), CT and CBCT can be used. In certain embodiments, it is preferred to use CT and/or CBCT, as described herein.

Adjoining Region

An adjoining region of an implant is described. The adjoining region 51 is positioned at the proximal end of the longitudinally extending distal portion 34. In certain aspects, the exterior surface of the adjoining region 51 comprises a roughened surface. The roughened can have an $R_a$ of between about 5 and about 30 um. The parameter $R_a$ is well understood in the art. By convention every roughness parameter is a capital R followed by additional characters in the subscript. The subscript identifies the formula that was used, and the R means that the formula was applied to a 2D roughness profile. $R_a$ is the average of the roughness profile. It means the value obtained by the following formula and expressed in micrometer (μm) when sampling only the reference length from the roughness curve in the direction of the mean line, taking X-axis in the direction of mean line and Y-axis in the direction of longitudinal magnification of this sampled part and the roughness curve is expressed by y=f(x):

$$Ra = \frac{1}{l}\int_0^l \{f(x)\}dx$$

A roughness tester can be used to quickly and accurately determine surface texture or surface roughness of a material. A roughness tester typically shows the measured roughness depth ($R_z$) as well as the mean roughness value ($R_a$) in um. Roughness testers are commercially available. An example of a roughness tester is the PCE-RT 10 from PCE Instruments UK Ltd. In certain embodiments, at least a portion of the exterior surface of the adjoining region 51 can comprise a polished finish at the proximal end thereof, suitably, wherein the polished finish is a mirrored or super mirrored finish. The $R_a$ can be between about 1 and about 3 um. This polished finish at the distal end of the adjoining region 51 can have a height of up to about 100 um and may facilitate reducing the risk of infection as bacteria may be unable to attach to this portion of the adjoining region 51.

As discussed below, the shape, size and height of the adjoining region 51 can be adapted to (precisely) fit a subject into which the implant is to be inserted. The adjoining region 51 can therefore be customised to the needs of a subject. The size and shape of the adjoining region 51 can be configured based on the data obtained from determining the mandibular bone size and shape around a natural tooth in situ or a natural void in situ in which a natural tooth has previously been present and, as required, determining the presence of one or more anatomical structures (for example, blood vessels, nerves, roots and the position of adjoining teeth) around the natural tooth or the natural void.

In one aspect, the adjoining region 51 can have a non-circular cross section. Suitably the non-circular cross section is any non-circular shape that minimises, prevents or inhibits rotation of the adjoining region 51 once it is implanted into the bone of the human or animal subject. This is advantageous because it can offer increased resistance to twisting or rotation during use, thereby helping to secure the implant in place. The non-circular cross section of the adjoining region 51 can resemble, match or correspond exactly to the former in situ tooth cross section.

Suitably, the shape of the adjoining region 51 resembles, matches or corresponds exactly to the former in situ tooth cross section.

In one embodiment, the non-circular cross section is an oval but any other shape is contemplated that minimises, prevents or inhibits rotation of the adjoining region 51 in use.

Suitably, the cross sectional area of the proximal end of the longitudinally extending distal portion 34 is less (for example, about 10%, about 20%, about 30%, about 40% or about 50% less) than the cross sectional area of the proximal end of the adjoining region 51. Referring to FIG. 1, for example, it will be appreciated that the cross sectional area of the proximal end of the adjoining region 51 is greater (for example, about 10%, about 20%, about 30%, about 40% or about 50% greater) than the cross sectional area of the proximal end of the longitudinally extending distal portion 34 or the cross sectional area of the distal end of the adjoining region 51.

In certain embodiments, the cross sectional area of the distal end of the adjoining region 51 is substantially the same as the cross sectional area of the proximal end of the longitudinally extending distal portion 34.

The adjoining region 51 can transition outwardly from its distal end towards its proximal end. As the adjoining region 51 transitions outwardly from its distal end towards its proximal end the cross sectional area of the adjoining region 51 increases.

The cross sectional area of the proximal end of the longitudinally extending distal portion 34 can be less (for example, about 10%, about 20%, about 30%, about 40% or about 50% less) than the cross sectional area of the distal end of the proximal end of the adjoining region 51.

Figure 3:
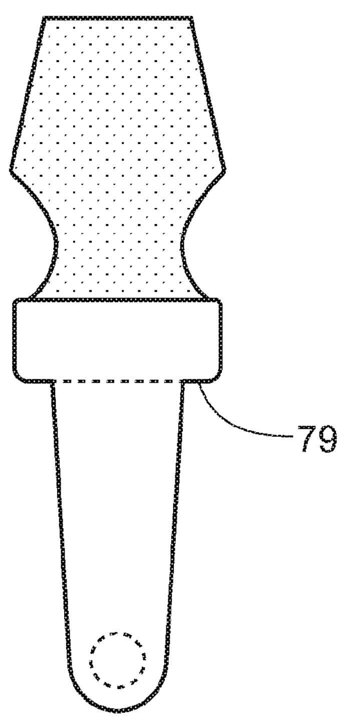
FIG. 3 illustrates the implant 30 according to one embodiment of the present disclosure in which the adjoining region 51 incorporates a shoulder 79.

The adjoining region 51 can be a shoulder 79, suitably, wherein one or more corners of the shoulder are non-angular, suitably wherein the one or more corners of the shoulder 79 are rounded. This embodiment is depicted is FIG. 3.

There can be a lofted transition between the proximal end of the longitudinally extending distal portion 34 and the distal end of the adjoining region 51. The lofted transition is created by the change in shape between the longitudinally extending distal portion 34 and the adjoining region 51. The longitudinally extending distal portion 34 has a circular cross section, and the adjoining region 51 has a non-circular cross section.

Figure 5:
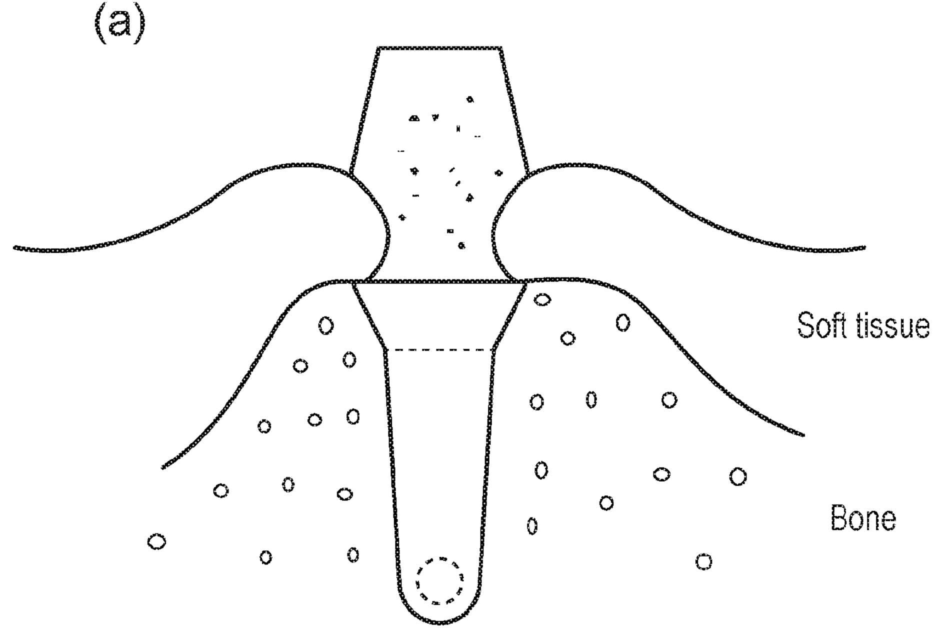
FIG. 5(*a*) illustrates an implant 30 according to one embodiment of the present disclosure implanted into a human or animal subject. The longitudinally extending distal portion 34 and the adjoining region 51 adjoin the bone. The transmucosal portion 43 adjoins soft tissue. The abutment portion 24 protrudes above the soft tissue.
Figure 5:
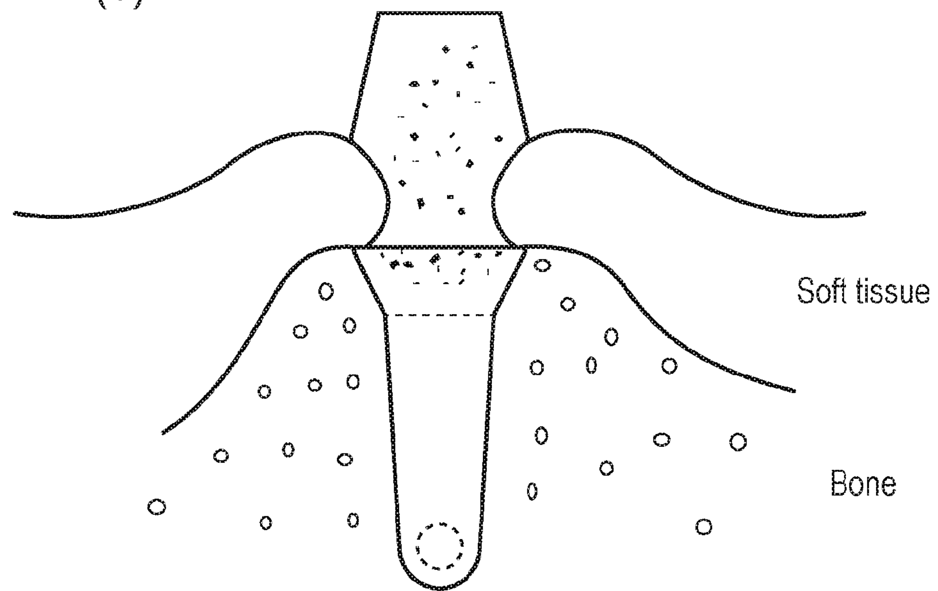

The cross sectional area of the distal end and/or the proximal end of the adjoining region 51 can correspond to the cross sectional area between adjoining soft tissues of a subject. As can be seen in FIG. 5(*a*), the proximal end of the adjoining region 51 is configured to fit between the adjoining soft tissues of a subject.

The cross sectional area of the proximal end of the adjoining region 51 can correspond to the cross sectional area of a tooth in situ that is to be replaced. In particular, the cross sectional area of the proximal end of the adjoining region 51 can correspond to the cross sectional area of the tooth to be replaced at the position at which bone adjoins soft tissue. As can be seen in FIG. 5(*a*) for example, the proximal end of the adjoining region 51 aligns with the position or height at which bone adjoins soft tissue. The cross sectional area of a tooth to be replaced in a subject at this position or height can be determined such that the cross section of at least the proximal end of the adjoining region 51 matches it.

Figure 7:
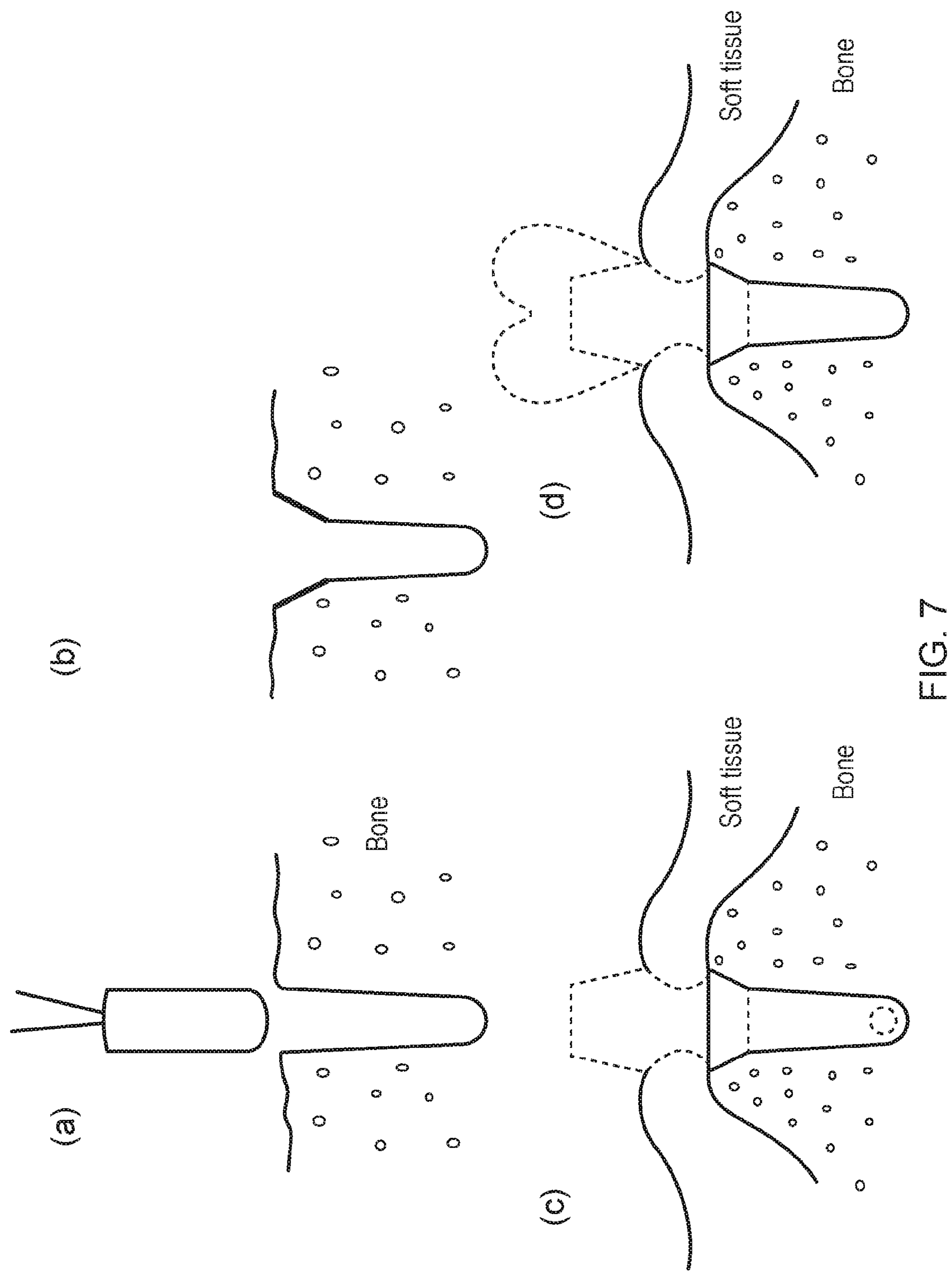
FIG. 7 describes the steps of fitting an implant 30 into a human or animal subject. In step (a) a bore is created using a drill. In step (b) the shape of the bore is altered to match the shape of the adjoining region 51. In step (c) the implant 30 is inserted into the bone of the human or animal subject. In step (d) a dental prosthesis 96 is fitted to the abutment portion 24.
Figure 8:
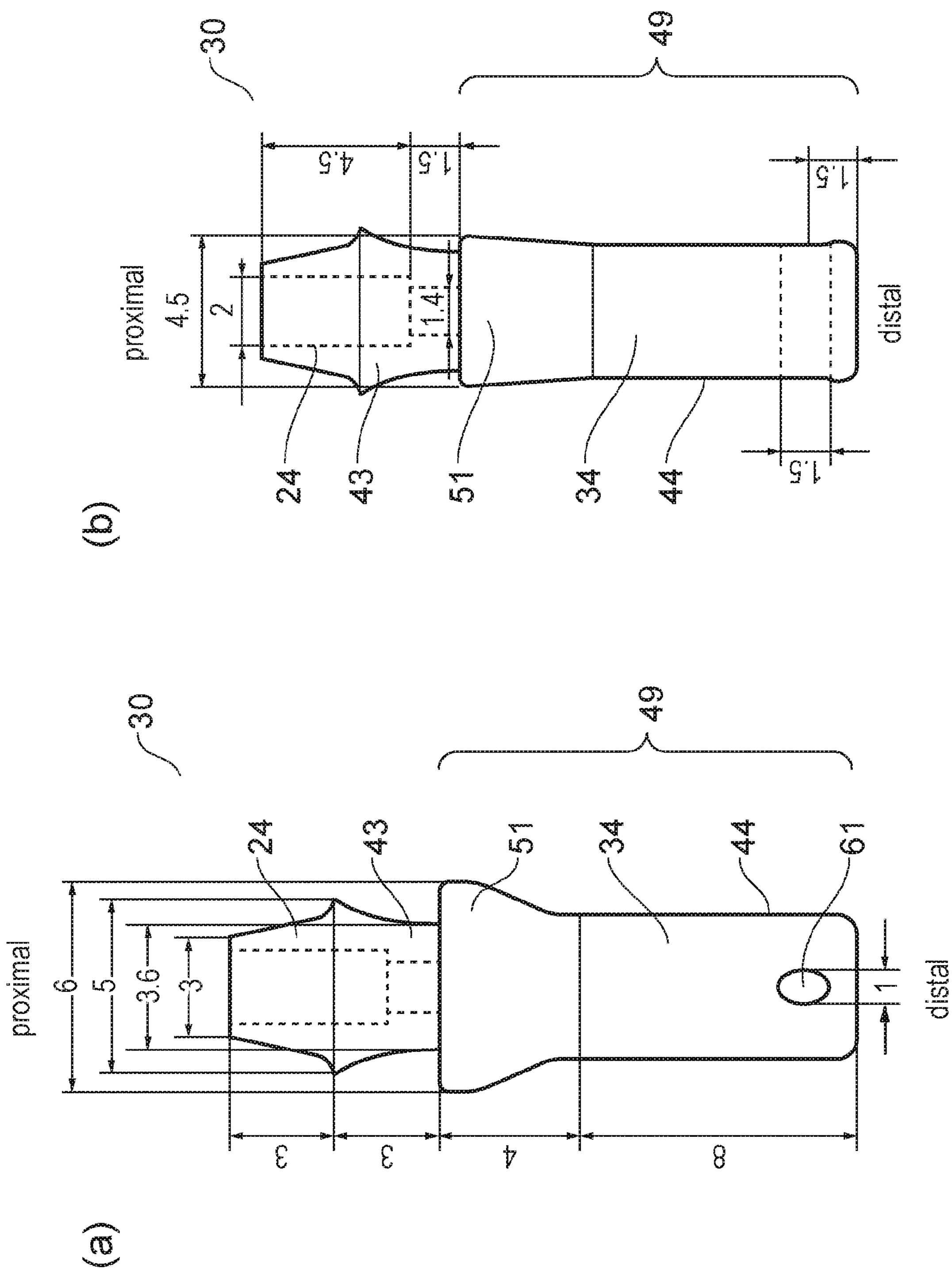
FIG. 8(*a*) illustrates a front view of an implant 30 according to an embodiment of the present disclosure. Measurements are in mm.
Figure 8:
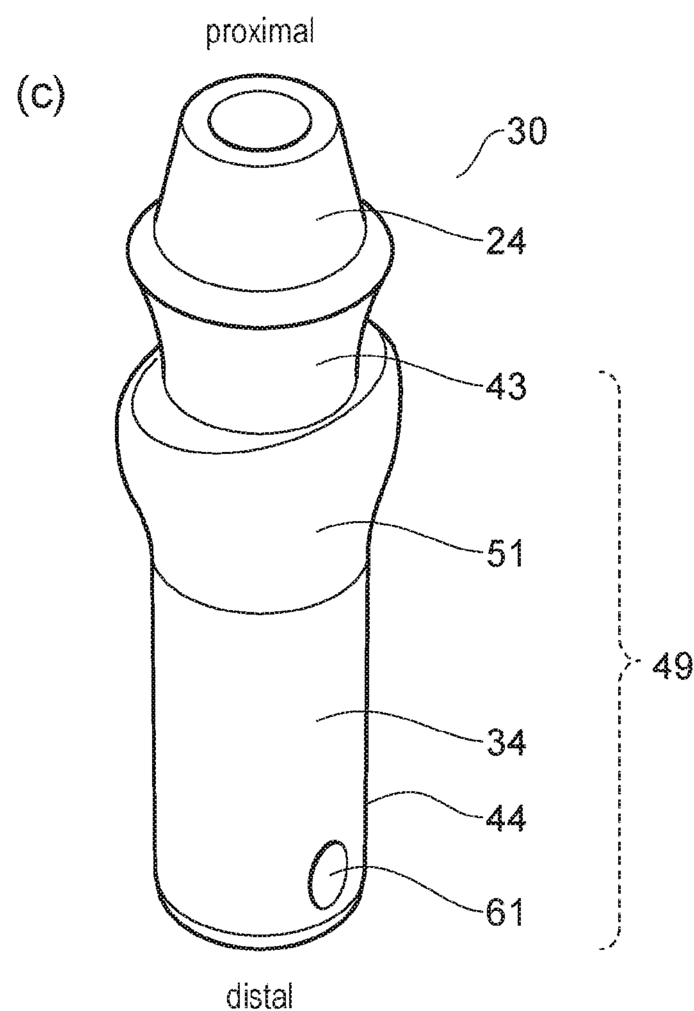
Figure 8:
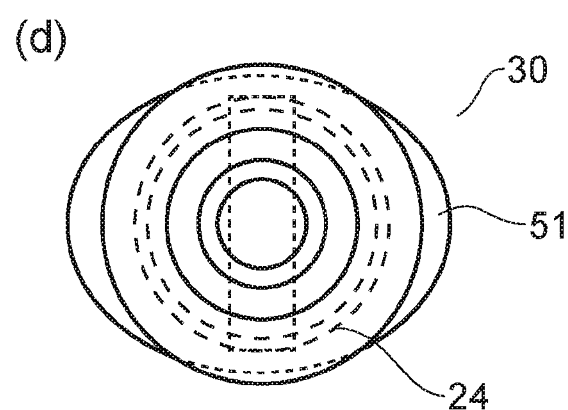

Suitably, the bone of the subject is shaped in order to accommodate the shape of at least the adjoining region 51. Dental drills will produce a bore with a substantially circular cross section. This will be unable to accommodate the shape of the adjoining region 51 as it non-circular in shape. Accordingly, the shape of the bore is adjusted to accommodate the shape of the adjoining region 51. When the void or bore needs to be shaped to accommodate the shape of the adjoining region 51, it is preferred that the means used to shape the void or bore in the bone does not damage (for example, burn) the bone as this will delay healing times and may promote infection and the like. Various techniques can be used to shape the void or bore—such as piezoelectric ultrasonics or laser. Suitably therefore, the bone can be prepared to fit the adjoining region 51 by shaping the void or bore to match the shape of the implant 30. Suitably, the bone is prepared to precisely fit the adjoining region 51 by shaping the void or bore to exactly match the shape of the implant 30, as depicted in FIG. 7. This distance can be exactly determined using imaging as described herein.

The use of piezoelectric ultrasonics is particularly suitable. The ultrasonic frequency is created by driving an electric current from a generator over piezoceramic rings, which leads to their deformation. The resulting movement from the deformation of the rings sets up a vibration in a transducer and/or amplifier, which creates the ultrasound output. These waves are transmitted to a hand piece tip, also called an insert, where the longitudinal movement results in the cutting of osseous tissue by microscopic shattering of the bone and preventing incision or damage to soft tissue. Clinicians are able to make precise and narrow bone incisions with cuts as small as 0.5 millimetres to 0.7 millimetres or less, which is especially important in the context of the present disclosure where the void is being specifically shaped to match the shape of the implant 30. Piezo surgery units use chilled saline as an irrigant, which serves several functions. Because the irrigant is chilled, it provides a cooling effect to help prevent overheating of the bone and bone cells. This cooling combined with the specific waveform of causes minimal inflammation and/or necrosis in the bone. The results that can be obtained using piezoelectric ultrasonics are more predictable, improve healing, minimize trauma, and provide greater safety for human or animal subjects. Suitably, the void or burr is shaped using piezo or laser.

Suitably, the adjoining region 51 is devoid of threads, screw threads or blades.

The proximal end of the adjoining region 51 can comprise a planar surface—such as a flat surface.

The proximal end of the adjoining region 51 can be located at the distal end of the transmucosal portion 43.

As discussed above, at least a portion of the exterior surface of the bone engaging portion 49 can be porous in order to promote osseointegration with living bone, in certain aspects of the disclosure. Accordingly, the adjoining region 51 which is part of the bone engaging portion 49 can be porous in order to promote osseointegration with living bone. In one embodiment, a portion of the adjoining region 51—suitably, a proximal portion—can incorporate the same surface as the transmucosal portion 51, which as described below is a surface that is compatible with soft tissue. This embodiment is depicted in FIG. 5(*b*) where it is shown that the exterior surface of the transmucosal portion 51 extends into the adjoining region 51. This can have the advantage that bacteria are unable to attach to the adjoining region 51 which can further reduce the risk of infection. The adjoining region 51 can therefore have different finishes. In one embodiment, the adjoining region 51 can comprise a surface that is compatible with soft tissue that extends 0.1 to 2 millimetres from its proximal end or 0.1 to 1 millimetres from its proximal end or 0.1 to 0.5 millimetres from its proximal end.

In certain embodiments, the adjoining region 51 has a maximum long axis width of between about 5 to 12 millimetres. In certain embodiments, the adjoining region 51 has long axis widths of different sizes. For example, the adjoining region 51 can have a maximum long axis width of between about 5 to 12 millimetres at its proximal end and a long axis width of between about 3 to 6 millimetres at its distal end. Suitably, the adjoining region 51 has a length or height of between about 2 to 3 millimetres. Suitably, the adjoining region 51 has a long axis width that is between about 2 to 3 millimetres wider than the long axis width of the longitudinally extending distal portion 34.

In one embodiment, the surface finish of the adjoining region 51 is divided into two different surface finishes. In one embodiment, a proximal portion of the adjoining region 51 will have a polished surface—such as a smooth polished (mirrored) surface and a distal portion of the adjoining region 51 will have a porous surface. This may facilitate reducing the risk of infection, as described herein.

In another embodiment, a proximal portion of the adjoining region 51 of about 0.5 millimetres to about 1 millimetre in height will have a polished surface—such as a smooth polished (mirrored) surface finish and a distal portion of the adjoining region 51 of about 1 millimetre to about 1.5 millimetres in height will have a porous surface.

Transmucosal Portion

A transmucosal portion of an implant is described. The implant 30 can further comprise a transmucosal portion 43. In one aspect, the transmucosal portion 43 is positioned at the proximal end of the adjoining region 51.

In one aspect, the exterior surface of the transmucosal portion 43 comprises a plurality of micro holes 86.

As used herein, the term "micro hole" means a hole sized for the attachment or penetration of collagen fibers therein. A micro hole 86 can have a diameter of less than about 1 um to about 15 um, suitably, a diameter of between less than about 1 um to about 10 um in diameter, suitably, between less than 1 um to about 5 um in diameter. More suitably, the micro hole can have a diameter of between about 2 to about 15 um, suitably, a diameter of between about 2 to about 10 um in diameter, suitably, between about 2 to about 5 um in diameter. A micro hole 86 can have a diameter of 0.75 um, 0.5 um or 0.25 μm or less.

The depth of the micro holes 86 in the transmucosal portion 43 can be between about 10 to about 150 um. The depth of the micro holes 86 in the transmucosal portion 43 can be between about 10 to about 100 um. The depth of the micro holes 86 in the transmucosal portion 43 can be between about 10 to about 50 um.

The transmucosal portion 43 can comprise between about 50 to about 5000 micro holes 86—such as 50 to 4000 micro holes 86, 50 to 3000 micro holes 86, 50 to 2000 micro holes 86, 50 to 1000 micro holes 86 or 50 to 500 micro holes 86.

The micro holes are created artificially in the implant and are therefore man-made. The micro holes can be created using laser micro drilling using solid state lasers of visual or infrared range types with percussion or trepanning drilling techniques. This enables machining of holes with controlled tamper in metals—such as titanium—at high drilling speed.

Advantageously, the use of micro holes 86 in the transmucosal portion 43 can facilitate or improve the integration or the interrelation between the transmucosal portion 43 and the collagen fibers present in the marginal soft tissue (gingival margin or free gingiva) of a subject into which the implant is to be inserted.

Figure 9:
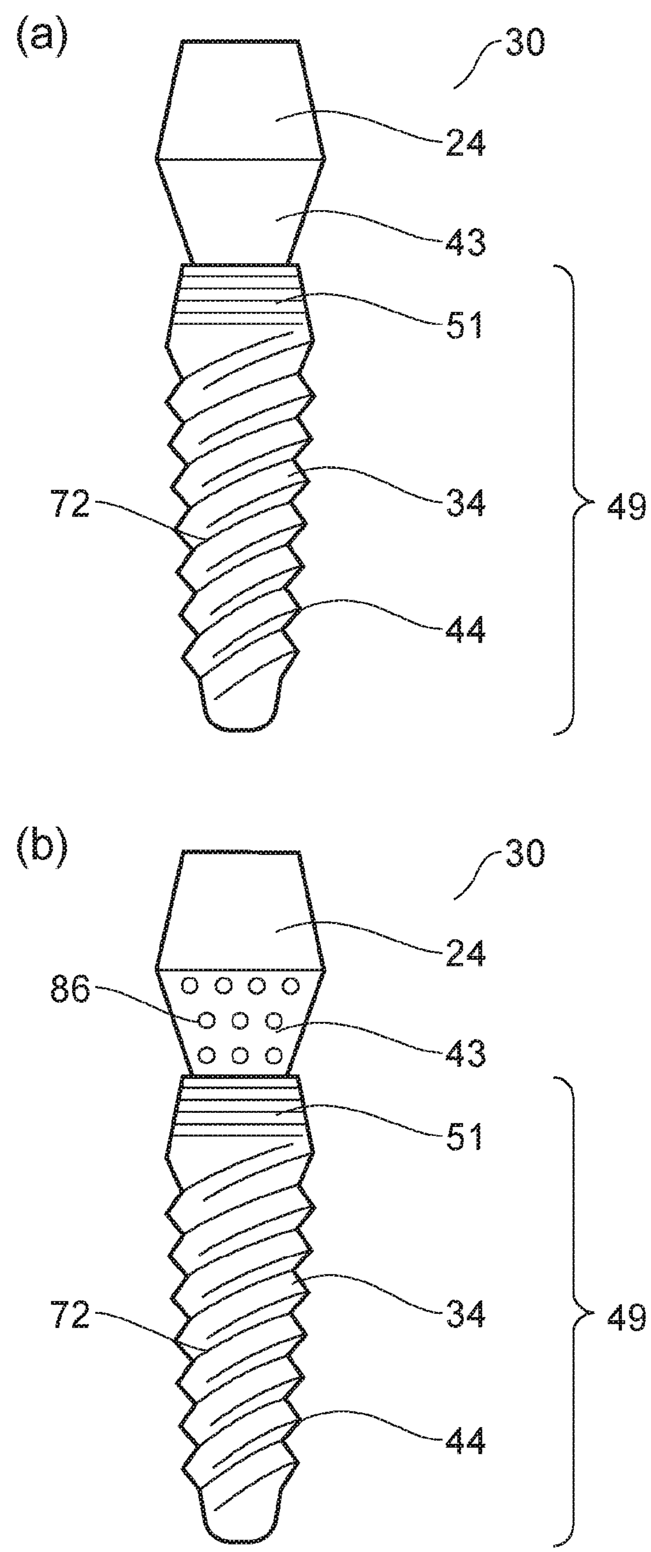
FIG. 9(*a*) illustrates an implant 30 according to an embodiment of the present disclosure in which the longitudinally extending distal portion 34 comprises a screw thread 72.
Figure 11:
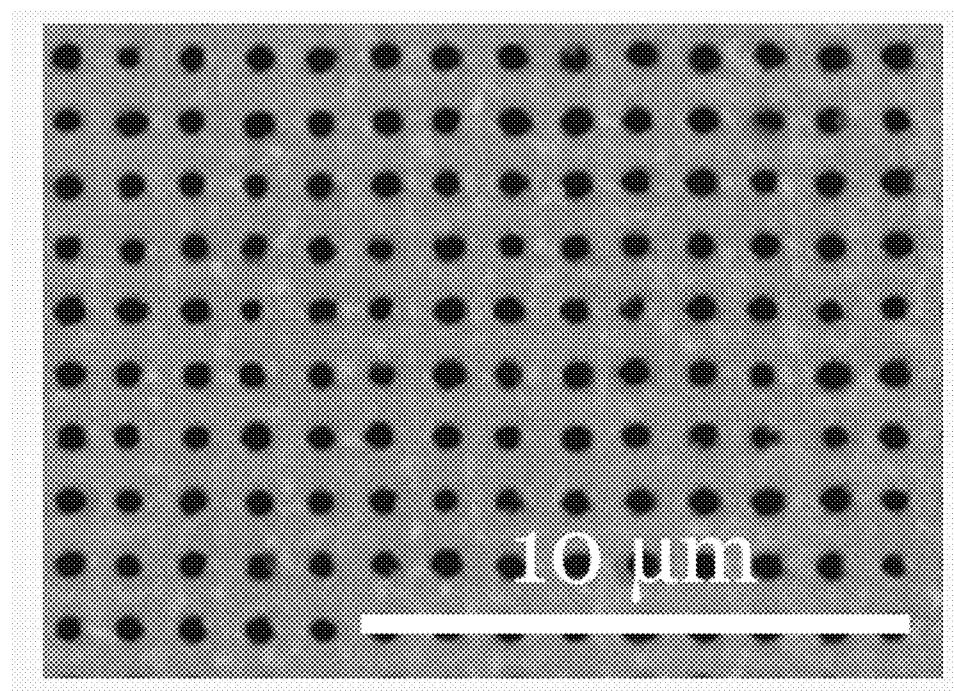
FIG. 11 illustrates micro holes in a metal sheet, each micro hole having a diameter of about 1 um.

FIG. 9 illustrates a transmucosal portion 43 comprising a plurality of micro holes 86. FIG. 11 illustrates a plurality of micro holes in a metal sheet, each micro hole having a diameter of less than about 1 um.

Methods—such as CT, CBCT and intra-oral scanning—can be used to measure the thickness (width) of marginal soft tissue. Based on this analysis it can be deduced if a subject has a thick (about 1.3 mm to about 1.5 mm), moderate (about 0.9 mm to about 1 mm mm) or thin (about 0.6 mm to 0.7 mm) marginal soft tissue. The quantity of collagen fibers—such as collagen fiber bundles—can then be predicted or determined. In a subject, the thicker the marginal soft tissue means that a greater number of collagen fibers will be naturally present that will attach to the natural tooth in situ at the enamel junction to help to anchor in place. In the implant 30 described herein, the micro holes 86 can be advantageously used to favour and enable attachment of the collagen fibers into or around the implant to create an environment that replicates natural teeth in situ where the collagen fibers naturally attach thereto. The micro holes 86 may allow a re-orientation of the collagen fibers by penetrating the micro holes 86 to strengthen the connection of marginal soft tissue with the implant.

The transmucosal portion 43 can be designed or configured as a plurality of layers comprising the micro holes 86. The micro holes 86 are located on the outside of the transmucosal portion 43. Whilst the micro holes 86 can be configured in any arrangement, one embodiment relates to a regularly/evenly spaced arrangement of micro holes 86 in the layers. The arrangement can, however, be random. The transmucosal portion 43 can be adapted based upon the thickness of the marginal soft tissue of a subject into which the implant is to be inserted.

The transmucosal portion 43 may comprise at least 4 layers, each layer comprising at least about 50 micro holes 86.

The transmucosal portion 43 may comprise at least 8 layers, each layer comprising at least about 50 micro holes 86.

The transmucosal portion 43 is adapted to conform to the thickness of the marginal soft tissue of a subject into which the implant is to be inserted.

By way of example, if the marginal soft tissue has a thickness of between about 0.6 mm to 0.7 mm the transmucosal portion 43 comprises at least 4 layers of micro holes 86. Each layer may comprise at least about 50 micro holes 86.

By way of further example, if the marginal soft tissue has a thickness of between about 0.6 mm to 0.7 mm the transmucosal portion is configured to comprise 4 or 5 layers of micro holes, each layer comprising at least about 50 micro holes.

By way of further example, if the marginal soft tissue has a thickness of between about 0.9 mm to 1.0 mm the transmucosal portion is configured to comprise at least about 6 layers of micro holes, each layer comprising at least about 50 micro holes.

By way of further example, if the marginal soft tissue has a thickness of between about 0.9 mm to 1.0 mm the transmucosal portion is configured to comprise 6 or 7 layers of micro holes, each layer comprising at least about 50 micro holes. By way of further example, if the marginal soft tissue has a thickness of between about 1.3 mm to about 1.5 mm then the transmucosal portion 43 can comprise at least 8 layers of micro holes 86. Each layer may comprise at least about 50 micro holes 86.

The distribution or arrangement or configuration of the micro holes 86 in the transmucosal portion 43 can be adapted to facilitate or improve the integration of the transmucosal portion 43 with the collagen fibers in the marginal soft tissue of a subject into which the implant is to be inserted.

By determining the marginal soft tissue thickness around the natural tooth in situ or the natural void in situ, the quantity of collagen fibers therein can be determined and based on the results the micro hole structure of the transmucosal portion 43 can be determined.

By determining the mandibular bone size and shape around a natural tooth in situ or a natural void in situ in which a natural tooth has previously been present and/or determining one or more anatomical structures around the natural tooth or the natural void and/or determining the marginal soft tissue thickness around the natural tooth in situ or the natural void in situ allows the micro hole structure of the transmucosal portion 43 to be determined.

A method of producing an implant comprising incorporating a plurality of micro holes into a portion of the implant that abuts marginal soft tissue, suitably a transmucosal portion 43 is also disclosed.

This portion can comprise an inwardly narrowed part.

The transmucosal portion 43 may have a non-circular cross section—such as an oval cross section. Suitably, the transmucosal portion 43 has a non-circular cross section at its distal end that matches the cross section of the proximal end of adjoining region 51.

Suitably, the transmucosal portion 43 narrows from the distal end in the proximal direction towards its middle and then widens in the proximal direction towards it proximal end.

Suitably, the cross sectional area of the inwardly narrowed part corresponds to the cross sectional area or gap that exists between adjoining soft tissues of a subject into which the implant is to be fitted. This distance can be exactly determined using imaging as described herein.

Figure 4:
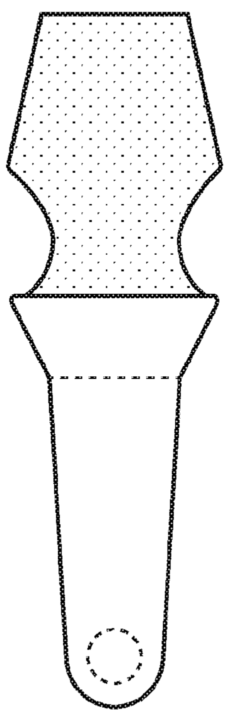
FIG. 4 illustrates an implant 30 that is platform shifted according to one embodiment of the present disclosure.

The transmucosal portion 43 can be platform shifted. This is depicted in FIG. 4. This is a method that can be used to preserve alveolar bone levels around dental implants. The concept refers to using a transmucosal portion 43 of narrower cross sectional area than the adjoining region 51, rather than placing a transmucosal portion 43 of similar cross sectional area, which is referred to as platform matching. The use of platform switching can help to prevent initial pen-implant bone loss. In platform matching, the cross sectional area of the transmucosal portion 43 matches the cross sectional area of the adjoining region 51. When platform switching is used, a transmucosal portion 43 with a narrower cross sectional area than the adjoining region 51 is used. In a further aspect, there is disclosed a platform switched transmucosal portion 43. In a further aspect there is disclosed a bone engaging portion 44 comprising a platform switched transmucosal portion 43.

The transmucosal portion 43 can have an exterior surface that is compatible with soft tissue, suitably soft tissue in the mouth of a subject if the implant is dental implant. By compatible, it is meant that the exterior surface does not irritate the soft tissue but instead can favour or assist in the healing of the soft tissue that abuts to or surrounds the sides of the transmucosal portion 43. The exterior finish of the transmucosal portion 43 limits, reduces or eliminates the attachment of soft tissue and bacteria and limits, reduces or eliminates the growth of the soft tissue into the transmucosal portion 43. This can create a seal to prevent the ingress and growth of bacteria which can lead to infection. In one embodiment, a least part of the exterior surface of the transmucosal portion 43 is non-porous. In another embodiment, at least a portion of the sides of the exterior surface of the transmucosal portion 43 are non-porous. In another embodiment, the entire sides of the exterior surface of the transmucosal portion 43 are non-porous. In another embodiment, the entire exterior surface of the transmucosal portion 43 is non-porous. In another embodiment, the entirety of the transmucosal portion 43 is non-porous.

Suitably, the exterior surface of the transmucosal portion 43 is a polished surface—such as a smooth polished surface or a polished surface or a super-polished surface.

Suitably, the transmucosal portion 43 is entirely solid. Suitably, the transmucosal portion 43 is devoid of voids, channels, threads, pores and the like.

The transmucosal portion 43 is made from biocompatible materials as described above.

Suitably the composition and/or surface finish of the transmucosal portion 43 is the same as the abutment portion 24.

The transmucosal portion 43 can be manufactured using various techniques although in certain embodiments 3D printing is particularly suitable—such as 3D metal printing or 3D plastic printing. As described herein, a large number of 3D printing processes are known including selective laser melting (SLM) or direct metal laser sintering (DMLS), selective laser sintering (SLS), fused deposition modelling (FDM), or fused filament fabrication (FFF), stereolithography (SLA) or laminated object manufacturing (LOM) or MLS. MLS is of particular interest in certain embodiments, especially in the manufacture of the micro holes as it combines the advantages of additive manufacturing and micrometry, enabling highly detailed resolution and surface quality.

In certain embodiments, the transmucosal portion 43 has a maximum long axis width which is the same as the maximum long axis width of the adjoin region 51—suitably, between about 5 to 12 millimetres. Suitably, the transmucosal portion 43 has a length or height of between about 2 to 3 millimetres.

In one embodiment, the surface finish of the transmucosal portion 43 is divided into two different surface finishes. In one embodiment, a proximal portion of the transmucosal portion 43 will have a polished surface—such as a smooth polished (mirrored) surface and a distal portion of the transmucosal portion 43 will have a porous surface. Without wishing to be bound by theory, this may enhance integration with cortical bone which may act as a seal against bacteria.

Abutment Portion

An abutment portion of an implant is described. The abutment portion 24 is positioned at the proximal end of the transmucosal portion 43. The abutment portion 24 is adapted to support a prosthesis at its proximal end.

Figure 6:
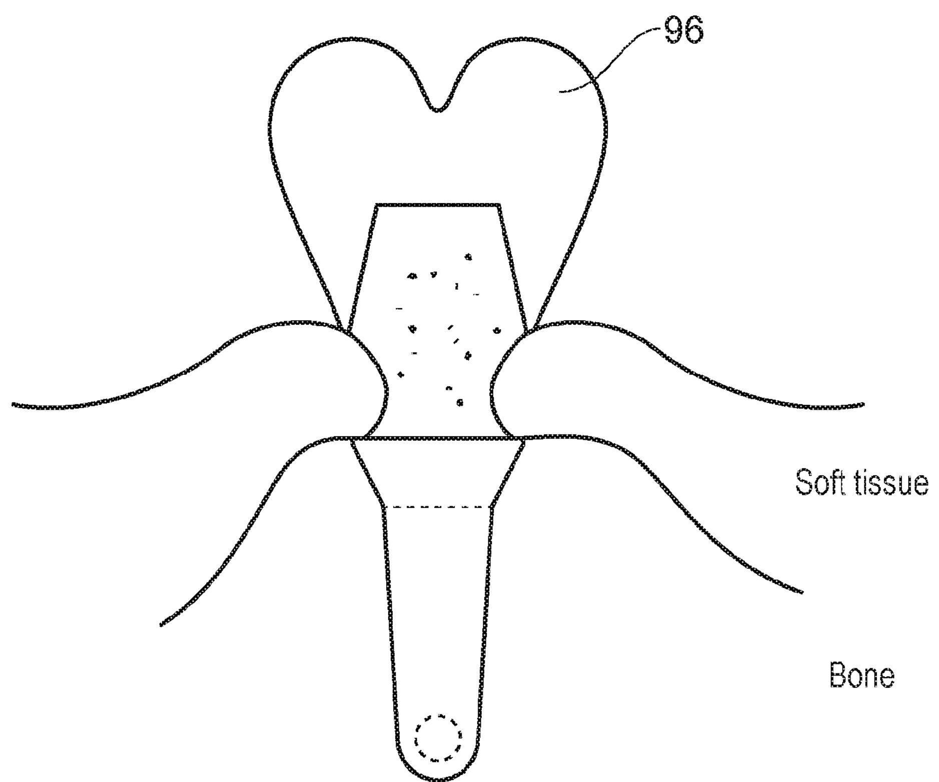
FIG. 6 illustrates an implant 30 according to one embodiment of the present disclosure implanted into a human or animal subject and fit with a dental prosthesis 96.

The abutment portion 24 can have a non-circular cross section—such as an oval cross section. The abutment portion 24 can further comprise a prosthesis 96 reversibly or non-reversibly engaged with the abutment portion 24 as shown in FIG. 6. For example, the prosthesis 96 can be a dental crown.

The shape, size and height of the abutment portion 24 can be adapted to fit a subject into which it is to be inserted.

When the implant is a dental implant, the abutment portion 24 can abut the soft tissue—such as the gum line or marginal soft tissue—in the mouth of a human or animal subject. Suitably, when the implant is a dental implant, the abutment portion 24 only exclusively abuts the soft tissue—such as the gum line or marginal soft tissue—in the mouth of a human or animal subject and does not abut the bone. Like the transmucosal portion 43, the abutment portion 24 can have an exterior surface that is compatible with soft tissue, suitably soft tissue in the mouth of a subject. By compatible, it is meant that the first exterior surface does not irritate the soft tissue but instead can favour or assist in the healing of the soft tissue that abuts to or surrounds the sides of the abutment portion 24. The exterior finish of the abutment portion 24 limits, reduces or eliminates the attachment of soft tissue and bacteria and limits, reduces or eliminates the growth of the soft tissue into the abutment portion 24.

In one aspect, the exterior surface of the abutment portion 24 is polished, suitably, to a mirrored or super mirrored finish. The exterior surface of the abutment portion 24 can have an $R_a$ of between about 1 and about 3 um.

In other aspects, at least part of the first exterior surface of the abutment portion 24 is non-porous. In another embodiment, at least a portion of the sides of the first exterior surface are non-porous. In another embodiment, the entire sides of the first exterior surface are non-porous. In another embodiment, the entire exterior surface of the abutment portion is non-porous. In another embodiment, the entirety of the abutment portion 24 is non-porous. Suitably, the abutment portion 24 is entirely solid. Suitably, the abutment portion 24 is devoid of voids, channels, threads, pores and the like.

The abutment portion 24 is made from biocompatible materials as described above.

Suitably, the abutment portion 24 has a non-circular cross section at its proximal end that is less than the non-circular cross section at the distal end.

Suitably, the abutment portion 24 has a non-circular cross section with a maximum long axis width of between about 6 to 8 millimetres. Suitably, the maximum long axis width of the abutment portion 24 is the same or about the same as the maximum long axis width of the proximal end of the adjoining region 51.

Suitably, the exterior surface of the abutment portion 24 is a polished surface—such as a smooth polished or super polished surface.

Suitably, the abutment portion 24 has an exterior that is separate from the exterior of the bone engaging portion 49 so that the surfaces, for example, the surface finishes, of the two portions 24, 49 are different.

The abutment portion 24 can comprise at least one recess or hole 28 for engagement of at least one attachment means—such as a screw 72—or the like. The attachment means can be present on a prosthesis 96 to enable engagement of the abutment portion 24 and the prosthesis 96. The engagement between the abutment portion 24 and the prosthesis 96 can be reversible or non-reversible as desired. The prosthesis 96 can be reversibly or non-reversibly attached to the proximal end of the abutment portion 24. The prosthesis 96 can comprise at least one attachment means 36 for engaging the at least one recess or hole 28 in the abutment portion 24.

The abutment portion 24 can be manufactured using various techniques although in certain embodiments 3D printing is particularly suitable—such as 3D metal printing or 3D plastic printing. As described herein, a large number of 3D printing processes are now available including selective laser melting (SLM) or DMLS, selective laser sintering (SLS), fused deposition modelling (FDM), or fused filament fabrication (FFF), stereolithography (SLA) or laminated object manufacturing (LOM) or MLS.

In certain embodiments, the abutment portion 24 has a maximum long axis width which is the same as the maximum long axis width of the transmucosal portion 43—suitably, between about 5 to 12 millimetres. Suitably, the abutment portion 24 has a length or height of between about 5 to 7 millimetres.

In one embodiment, the surface finish of the abutment portion 24 is divided into two different surface finishes. In one embodiment, a proximal portion of the abutment portion 24 will have a polished surface—such as a smooth polished (mirrored) surface and a distal portion of the abutment portion 24 will have a porous surface.

Non-Circular Cross Section

Various portions of the implant 30 can, in certain aspects, have a non-circular cross section as described herein and depicted in, for example, FIG. 2. The non-circular cross-section may be a convexly curved shape—such as an elliptical or obround or oval shape. Suitably, the non-circular cross section is an oval shape. The non-circular cross-section is a shape that minimises, prevents or inhibits rotation. This shape can increase stability, prevent rotation and further reduce the risk of unintentional loss or pull out of the implant 30. Suitably, the non-circular cross section of the various portions of the implant 30 resemble, matches or correspond exactly to the former in situ tooth cross section. Suitably, the shape of the various portions of the implant 30 resemble, match or correspond exactly to the former in situ tooth cross section. Suitably, the shape and dimensions of the various portions of the implant 30 resemble, match or correspond exactly to the former in situ tooth cross section.

Customised

The implant 30 or one or more portions thereof can be customised to correspond to the exact shape and dimensions of a human or animal subject's anatomy. In other words, the implant can be a patient customised implant tailored to the subject into which the implant is to be inserted. For instance, the implant 30 or one or more portions thereof may have dimensions, materials, and/or exterior surfaces that are configured to match the exact dimensions or requirements of a patient's anatomy. To accomplish this customisation, imaging technologies can be used as described herein to shape and size the implant 30 or one or more portions thereof to correspond to patient specific anatomy and that will integrate better into the human or animal body.

The patient-specific customization can be applied to any portion of the implant 30, or one or more or two or more or three portions of the implant 30, or to the entire implant 30. Suitably, every portion of the implant 30 is customised to the subject/patient. The portion(s) of the implant 30 or the implant 30 may be provided with particular dimensions or shapes which correspond exactly to the dimensions of a void or bore at a patient's implant site. The portion(s) of the implant 30 or the implant 30 may be provided with particular dimensions or shapes which correspond exactly to the dimensions of a tooth which is to be extracted or a tooth that has been extracted. The portion(s) of the implant 30 or the implant 30 may be provided with particular dimensions or shapes which correspond exactly to the space between adjoining soft tissues. In particular, the dimension or shape of the proximal end of the adjoining region 51 can correspond exactly to the space between adjoining soft tissues. In particular, the dimension or shape of the proximal end of the adjoining region 51 can correspond exactly to the dimension or shape of the corresponding part of a tooth that is to be replaced.

The bone engaging portion 49 or a portion thereof can be customised as described herein.

The longitudinally extending distal portion 34 can be customised as described herein, for example, in terms of shape, size and surface finish (for example, porosity).

The adjoining region 51 can be customised as described herein, for example, in terms of shape, size and surface finish (for example, porosity).

The transmucosal portion 43 can be customised as described herein, for example, in terms of shape, size and surface finish (for example, porosity).

The abutment portion 24 can be customised as described herein, for example, in terms of shape, size and porosity.

The number of micro holes 86 in the transmucosal portion 43 can be customised based upon the knowledge of the subject's marginal soft tissue thickness, as described herein.

The conformal microscale cell structure in the longitudinally distal portion 34 can be customised based upon the knowledge of the subject's bone mineral density and/or bone quality, as described herein. Accordingly, the implant 30 or one or more portions thereof or all portions thereof can be created specifically for each individual human or animal subject. Consequently, the shape and dimensions of the implant 30 or one or more portions thereof or all portions thereof will be unique for each individual human or animal subject. The precise shape or dimensions of the implant 30 or one or more portions thereof or all portions thereof can be derived in accordance with imaging data acquired from the human or animal subject, as described herein. The clinician or dentist is able to select a desired form of shape or dimensions and make the selection specifically for a particular examined subject site to receive the implant 30 or one or more portions thereof.

The precise shape and dimension of the implant 30 or one or more portions thereof can be determined by analysing (for example, imaging or digitally imaging) the human or animal subject's bone (for example, jaw bone or mandible bone and/or maxilla bone) volume (for example, width and/or height and/or length). For example, the precise shape and dimensions of the implant 30 or one or more portions thereof or all portions thereof can be determined by the human or animal subject's bone height. The precise shape and dimensions of the implant 30 or one or more portions thereof or all portions thereof can be determined by the human or animal subject's tooth that is to be replaced or the void into which the implant is to be inserted. The precise shape and dimensions of the implant 30 or one or more portions thereof or all portions thereof can be determined by the human or animal subject's bone volume and the human or animal subject's tooth that is to be replaced or the void into which the implant is to be inserted.

The shape and size of the implant 30 or one or more portions thereof or all portions thereof can precisely match the corresponding parts of the natural tooth in situ. The shape and size of the implant 30 or one or more portions thereof or all portions thereof can precisely match the corresponding parts of the void in which the natural tooth in situ previously sat. It is also contemplated herein that if the human or animal subject has insufficient bone height to accommodate the implant 30 that the shape and size of the implant 30 or one or more portions thereof or all portions thereof will take account of the bone height so that the implant 30 can be fitted. In this scenario, a customised bone engaging portion 49 or a customised longitudinally extending distal portion 34 and/or a customised adjoining region 51 and/or a customised abutment portion 24 can be fitted to take account of the insufficient bone height. For example, a customised bone engaging portion 49 or a customised longitudinally extending distal portion 34 and/or a customised adjoining region 51 that has a wider cross-sectional area can be used. By way of example, abutment portion 24 with a reduced height can be used.

Suitably, the customised shape of the implant 30 or one or more portions thereof or all portions thereof is configured using digital imaging—such as 3-dimensional digital imaging—so that the implant 30 or one or more portions thereof or all portions thereof is a customised digital implant. The data acquired from this analysis can be used to configure the implant 30 as described herein. A digital model of a human or animal subject's anatomy into which the implant 30 is to be introduced can be constructed using various instruments and methods that are known in the art. From this model the customised implant 30 can be prepared. If the implant is a dental implant then the human or animal subject's mouth or one or more parts thereof—such as the mandible and/or maxilla of the jaw bone—can be imaged. For example, the human or animal subject's tooth or teeth can be imaged. For example, the human or animal subject's void(s) previously occupied by the tooth or teeth can be imaged. For example, the human or animal subject's bone—such the mandible and/or maxilla of the jaw bone—can be imaged. Suitably, a combination of parts is imaged such as the human or animal subject's tooth or teeth and the human or animal subject's bone—such as the mandible and/or maxilla of the jaw bone.

A detailed analytic or mathematical or visual model—such as a 3 dimensional model—can be constructed using the imaging data. The model can be used to represent the anatomical structure of bone and soft gingival tissue, bone density and the implant designed based on this information.

By way of example, images may be obtained using CB or CBCT based scanning technology that is well known in the art. See, for example, Clinical Applications of Cone-Beam Computed Tomography in Dental Practice, *JCDA*, Vol. 72, No. 1 (February 2006). CBCT is medical imaging technique using X-ray computed tomography where the X-rays are divergent, forming a cone. It provides fast and accurate visualisation of bony anatomical structures in three dimensions in high resolution. During imaging, the CBCT scanner rotates around the human or animal subject's head, obtaining numerous distinct images. The scanning software collects the data and reconstructs it, producing a digital volume composed of three-dimensional voxels of anatomical data that can be manipulated and visualized with specialised software. The scanning software can also be used to determine bone mineral density. There are numerous commercially available systems for CBCT including DynaCT (Siemens Medical Solutions, Forchheim, Germany), XperCT (Philips Medical Systems, Eindhoven, the Netherlands), and Innova CT (GE Healthcare, Waukesha, Wis.). CBCT imaging data can be communicated using the well-known Digital Imaging and Communications in Medicine (DICOM) standard. DICOM files can provide detailed, three-dimensional representations of the human or animal subject's dentition and supporting jaw bone. For DICOM data acquisition and visualisation commercial software is available—such as CoDiagnostix by Dental Wings or Dental System CAD Software by 3Shape. The DICOM data file(s) may be made available over a network. For example, the data file(s) may be forwarded to a processing center, preferably over a secure data link. The compressed data files may then be remotely accessed and processed securely, for example, via a virtual private network, then forwarded from a server center to the practitioner. The data can be exported to the required software to produce the image and carry out the required analysis. While CBCT provides insights into the 3D structure of the bone for implant placement, it is not always optimal for replicating the surface detail of teeth or surrounding anatomical structures. Surface data acquisition can be accomplished by using various methods—such as (1) placing a stone cast into an optical scanner to capture the surface detail and occlusal morphology; (2) placing a stone cast into the same CBCT scan machine with the same settings as the human or animal subject's scan; or (3) using intraoral scanners to take a virtual impression of the human or animal subject's dentition. The process can been further enhanced through the use of software applications that allow data from different sources to be combined. Merging the digital information from different methods (for example, optical or DICOM) with the original CBCT data can enhance the imaging.

By way of further example, intraoral scanning can be used, which scans the dentition intra orally. It can be used alone or in combination with CT or CBCT. Examples of intra oral scanners are 3M Brontes Scanner, Cadent iTereo, Orametrix and SureSmile. The surface scan data which details the surface contours of the mouth can also be used to construct the model. A surface scan can provide a highly accurate depiction of the gingival tissue, as well as the clinical crown shape, contour and morphology of the teeth above the gum line. Intraoral scanning data can be communicated using the .STL format. The .STL file(s) may be made available over a network. For example, the file(s) may be forwarded to a processing center, preferably over a secure data link. The compressed files may then be remotely accessed and processed securely, for example, via a virtual private network, then forwarded from a server centre to the user. The data can be exported to the required software to produce the image. If required, CT/CBCT and intraoral scanning can be used on the same human or animal subject. For example, a CT/CBCT scan can be performed and the resultant DICOM data files exported to the required software. An optical scan can also be carried out using an intraoral scanning unit. The resultant .STL data files are exported to the required software. The DICOM and .STL files types can then be merged in the software to produce a highly detailed 3D rendered image.

If required, a bone scan can be performed. A bone scan can be generated by Cone Beam CT machines such as i-CAT®, Iluma®, NewTom®, Galileos, Scanora, ProMax3D and PreXion. This scan may give volumetric data of the bone, and is generally generated in a DICOM format. The bone scan can give information about the jawbone, teeth and nerve. The bone scan data can also provide information on the human or animal subject's existing crown formations relative to the jawbone, the location of tooth roots, the bone and ligament structure supporting the teeth, and the location of other soft tissue such as nerve endings. These images can provide information on the depth and variation in bone density that can support, or is available for supporting the implant 30, as well as the adjacent areas of the mouth that are to be avoided, such as nerve endings and/or weak or less dense bone structure.

As described herein several methods are also well known to measure bone density which can be used to generate suitable data for use in the present disclosure.

Once the computerised image has been produced, the attributes (for example, the shape and dimension etc) of the tooth to be replaced are precisely determined from the computer model. The determination of the appropriate implant, for example, the size, location, orientation, abutment and crown and the like can be then formulated based on the imaging data.

For a missing tooth, the size, shape and loading of the missing tooth can be incorporated into the computer model as if it were not missing from the human or animal subject's mouth. The determination of the appropriate implant, for example, the size, location, orientation of the fixture, abutment and crown is formulated based on the properties of this modelled tooth.

Configuring

Aspects of the present disclosure relate to methods for configuring or designing or preparing an implant. One such method relates to a method of configuring an implant according to the present disclosure. It comprises: (i) determining the mandibular bone size and shape around a natural tooth in situ or a natural void in situ in which a natural tooth has previously been present. It further comprises: (ii) determining one or more anatomical structures around the natural tooth or the natural void. The anatomical structures can be blood vessels, nerves, roots or the position of adjoining teeth or the like. It further comprises: (iii) determining the mandibular bone mineral density and/or the mandibular bone quality around the natural tooth in situ or the natural void in situ. It further comprises: (iv) determining the marginal soft tissue thickness around the natural tooth in situ or the natural void in situ to determine the quantity of collagen fibers therein. Methods for carrying out these determining steps are described herein, and can include CT or CBCT or intra-oral scanning. It further comprises: (v) using the results/data obtained in step (i) and step (ii) and step (iii) to configure the size, shape and conformal microscale cell structure of the longitudinally extending distal portion (34). The shape of the portions of the implant can be designed using a CAD/CAM system. It further comprises: (vi) using or processing the results/data obtained in step (i) and step (ii) to configure the size and shape of the adjoining region (51) and the abutment portion 24. The shape of the portions of the implant can be designed using a CAD/CAM system. It further comprises: (vii) using or processing the results/data obtained in steps (i) to (ii) and (iv) to configure the size, shape and micro hole structure of the transmucosal portion 43. The shape of the portions of the implant can be designed using a CAD/CAM system. Steps (i) to (iv) can be performed in any order and steps (v) to (vii) can be performed in any order.

According to this method, the implant can be customised according to the specific patient from which the results/data have been obtained. In addition to size and shape, the conformal microscale cell structure of the longitudinally extending distal portion can be configured based on the bone mineral density and/or bone quality. In addition, the micro hole structure of the transmucosal portion can be configured based on the thickness of the marginal soft tissue.

By way of example, if the marginal soft tissue has a thickness of between about 0.6 mm to 0.7 mm the transmucosal portion 43 can be configured to comprise at least about 4 layers of micro holes, each layer comprising at least about 50 micro holes.

By way of further example, if the marginal soft tissue has a thickness of between about 0.6 mm to 0.7 mm the transmucosal portion is configured to comprise 4 or 5 layers of micro holes, each layer comprising at least about 50 micro holes.

By way of further example, if the marginal soft tissue has a thickness of between about 0.9 mm to 1.0 mm the transmucosal portion is configured to comprise at least about 6 layers of micro holes, each layer comprising at least about 50 micro holes.

By way of further example, if the marginal soft tissue has a thickness of between about 0.9 mm to 1.0 mm the transmucosal portion is configured to comprise 6 or 7 layers of micro holes, each layer comprising at least about 50 micro holes. By way of further example, if the marginal soft tissue has a thickness of between about 1.3 mm to about 1.5 mm the transmucosal portion 43 can be configured to comprise at least about 8 layers of micro holes, each layer comprising at least about 50 micro holes.

Accordingly, the distribution of the micro holes in the transmucosal portion 43 can be adapted or configured to facilitate or improve the integration of the transmucosal portion 43 with the collagen fibers in the marginal soft tissue of a subject into which the implant is to be inserted. By way of further example, if the bone mineral density determined in step (iii) is 1 then the cells in the conformal microscale cell structure of the bone engaging portion 34 can be sized in the range of about 25 um to about 50 um in length.

By way of further example, if the bone mineral density determined in step (iii) is 2 then the cells in the conformal microscale cell structure of the bone engaging portion 34 can be sized in the range of about 28 um to about 50 um in length.

By way of further example, if the bone mineral density determined in step (iii) is 3 then the cells in the conformal microscale cell structure of the bone engaging portion 34 can be sized in the range of about 30 um to about 50 um in length.

By way of further example, if the bone mineral density determined in step (iii) is 4 then the cells in the conformal microscale cell structure of the bone engaging portion 34 can be sized in the range of about 35 um to about 50 um in length.

Once configured or designed, the implant can be fabricated or produced using, for example, additive layer manufacturing as described herein. The implant can be fabricated or produced from Titanium powder with a grain size of less than about 7 um. The implant can be fabricated using micro layer sintering, suitably, using a layer thickness during micro layer sintering of less than 6 um.

A further aspect relates to method of configuring or designing or preparing an implant described herein. It comprises: (i) determining the mandibular bone size and shape around a natural tooth in situ or a natural void in situ in which a natural tooth has previously been present. It comprises (ii) determining one or more anatomical structures around the natural tooth or the natural void, said anatomical structures selected from the group consisting of blood vessels, nerves, roots and the position of adjoining teeth or a combination of two or more thereof. It comprises: (iii) determining the mandibular bone mineral density and/or the mandibular bone quality around the natural tooth in situ or the natural void in situ. It comprises (iv) using the results/data obtained in steps (i) to (iii) to configure the size, shape and conformal microscale cell structure of the portion adapted to abut bone, suitably, the longitudinally extending distal portion 34. Steps (i) to (iii) can be performed in any order.

According to this method, the implant can be customised according to the specific patient from which the results/data have been obtained. In addition to size and shape, the conformal microscale cell structure of the longitudinally extending distal portion can be configured based on the bone mineral density or bone quality.

By way of example, if the bone mineral density determined in step (iii) is 1 then the cells in the conformal microscale cell structure of the bone engaging portion 34 can be sized in the range of about 25 um to about 50 um in length.

By way of further example, if the bone mineral density determined in step (iii) is 2 then the cells in the conformal microscale cell structure of the bone engaging portion 34 can be sized in the range of about 28 um to about 50 um in length.

By way of further example, if the bone mineral density determined in step (iii) is 3 then the cells in the conformal microscale cell structure of the bone engaging portion 34 can be sized in the range of about 30 um to about 50 um in length.

By way of further example, if the bone mineral density determined in step (iii) is 4 then the cells in the conformal microscale cell structure of the bone engaging portion 34 can be sized in the range of about 35 um to about 50 um in length.

Once configured or designed, the implant can be fabricated or produced using, for example, additive layer manufacturing as described herein. The implant can be fabricated or produced from Titanium powder with a grain size of less than about 7 um. The implant can be fabricated using micro layer sintering, suitably, using a layer thickness during micro layer sintering of less than 6 um.

There is also described a method of configuring or designing or preparing an implant according to the present disclosure. It comprises: (i) determining the marginal soft tissue thickness around the natural tooth in situ or the natural void in situ to determine the quantity of collagen fibers therein. It comprises: (ii) using the results/data obtained in step (i) to configure the size, shape and microhole structure of the portion adapted to abut marginal soft tissue, suitably the transmucosal portion 43.

According to this method, the implant can be customised according to the specific patient from which the results/data have been obtained. In addition to size and shape, the micro hole structure of the transmucosal portion 43 can be configured based on the thickness of the marginal soft tissue.

By way of example, if the marginal soft tissue has a thickness of between about 0.6 mm to 0.7 mm the transmucosal portion 43 can be configured to comprise at least about 4 layers of micro holes, each layer comprising at least about 50 micro holes.

By way of further example, if the marginal soft tissue has a thickness of between about 0.6 mm to 0.7 mm the transmucosal portion is configured to comprise 4 or 5 layers of micro holes, each layer comprising at least about 50 micro holes.

By way of further example, if the marginal soft tissue has a thickness of between about 0.9 mm to 1.0 mm the transmucosal portion is configured to comprise at least about 6 layers of micro holes, each layer comprising at least about 50 micro holes.

By way of further example, if the marginal soft tissue has a thickness of between about 0.9 mm to 1.0 mm the transmucosal portion is configured to comprise 6 or 7 layers of micro holes, each layer comprising at least about 50 micro holes. By way of further example, if the marginal soft tissue has a thickness of between about 1.3 mm to about 1.5 mm the transmucosal portion 43 can be configured to comprise at least about 8 layers of micro holes, each layer comprising at least about 50 micro holes.

Accordingly, the distribution of the micro holes in the transmucosal portion 43 can be adapted or configured to facilitate or improve the integration of the transmucosal portion 43 with the collagen fibers in the marginal soft tissue of a subject into which the implant is to be inserted. Once configured or designed, the implant can be fabricated or produced using, for example, additive layer manufacturing as described herein. The implant can be fabricated or produced from Titanium powder with a grain size of less than about 7 um. The implant can be fabricated using micro layer sintering, suitably, using a layer thickness during micro layer sintering of less than 6 um.

There is also described a method of configuring or designing or preparing an implant. It comprises: (i) providing a digital data set from a subject into which an implant is to be inserted, said digital data set comprising information on: the mandibular bone size and shape around a natural tooth in situ or a natural void in situ in which a natural tooth has previously been present; one or more anatomical structures around the natural tooth or the natural void, said anatomical structures selected from the group consisting of blood vessels, nerves, roots and the position of adjoining teeth or a combination of two or more thereof; the mandibular bone mineral density and/or the mandibular bone quality around the natural tooth in situ or the natural void in situ; and the marginal soft tissue thickness around the natural tooth in situ or the natural void in situ to determine the quantity of collagen fibers therein. It further comprises (ii) configuring an implant based on the digital data set obtained in step (i).

Step (ii) can comprise configuring the size, shape, conformal microscale cell structure and microhole structure of the implant based on the digital data set obtained in step (i).

The method can comprise designing a longitudinally extending distal portion, an adjoining region 51 positioned at the proximal end of the longitudinally extending distal portion 34, a transmucosal portion 43 positioned at the proximal end of the adjoining region 51 and an abutment portion 24 positioned at the proximal end of the transmucosal portion 43 of an implant based on the digital data set obtained in step (i).

According to this method, the implant can be customised according to the specific patient from which the results/data have been obtained. In addition to size and shape, the conformal microscale cell structure of the longitudinally extending distal portion can be configured based on the bone mineral density or quality. In addition, the micro hole structure of the transmucosal portion can be configured based on the thickness of the marginal soft tissue.

By way of example, if the marginal soft tissue has a thickness of between about 0.6 mm to 0.7 mm the transmucosal portion 43 can be configured to comprise at least about 4 layers of micro holes, each layer comprising at least about 50 micro holes.

By way of further example, if the marginal soft tissue has a thickness of between about 0.6 mm to 0.7 mm the transmucosal portion is configured to comprise 4 or 5 layers of micro holes, each layer comprising at least about 50 micro holes.

By way of further example, if the marginal soft tissue has a thickness of between about 0.9 mm to 1.0 mm the transmucosal portion is configured to comprise at least about 6 layers of micro holes, each layer comprising at least about 50 micro holes.

By way of further example, if the marginal soft tissue has a thickness of between about 0.9 mm to 1.0 mm the transmucosal portion is configured to comprise 6 or 7 layers of micro holes, each layer comprising at least about 50 micro holes. By way of further example, if the marginal soft tissue has a thickness of between about 1.3 mm to about 1.5 mm the transmucosal portion 43 can be configured to comprise at least about 8 layers of micro holes, each layer comprising at least about 50 micro holes.

Accordingly, the distribution of the micro holes in the transmucosal portion 43 can be adapted or configured to facilitate or improve the integration of the transmucosal portion 43 with the collagen fibers in the marginal soft tissue of a subject into which the implant is to be inserted.

By way of further example, if the bone mineral density determined in step (iii) is 1 then the cells in the conformal microscale cell structure of the bone engaging portion 34 can be sized in the range of about 25 um to about 50 um in length.

By way of further example, if the bone mineral density determined in step (iii) is 2 then the cells in the conformal microscale cell structure of the bone engaging portion 34 can be sized in the range of about 28 um to about 50 um in length.

By way of further example, if the bone mineral density determined in step (iii) is 3 then the cells in the conformal microscale cell structure of the bone engaging portion 34 can be sized in the range of about 30 um to about 50 um in length.

By way of further example, if the bone mineral density determined in step (iii) is 4 then the cells in the conformal microscale cell structure of the bone engaging portion 34 can be sized in the range of about 35 um to about 50 um in length.

Once configured or designed, the implant can be fabricated or produced using, for example, additive layer manufacturing as described herein. The implant can be fabricated or produced from Titanium powder with a grain size of less than about 7 um. The implant can be fabricated using micro layer sintering, suitably, using a layer thickness during micro layer sintering of less than 6 um.

A further method of configuring or designing or preparing an implant is described herein. It comprises: (i) providing a digital data set from a subject into which an implant is to be inserted, said digital data set comprising information on: the mandibular bone size and shape around a natural tooth in situ or a natural void in situ in which a natural tooth has previously been present; one or more anatomical structures around the natural tooth or the natural void, said anatomical structures selected from the group consisting of blood vessels, nerves, roots and the position of adjoining teeth or a combination of two or more thereof; and the mandibular bone mineral density and/or the mandibular bone quality around the natural tooth in situ or the natural void in situ. It further comprises: (ii) configuring an implant based on the digital data set obtained in step (i).

Step (ii) can comprise configuring the size, shape and conformal microscale cell structure based on the digital data set obtained in step (i).

The method can further comprise configuring or designing or preparing a longitudinally extending distal portion, an adjoining region 51 positioned at the proximal end of the longitudinally extending distal portion 34 and an abutment portion 24 of an implant based on the digital data set obtained in step (i).

According to this method, the implant can be customised according to the specific patient from which the results/data have been obtained. In addition to size and shape, the conformal microscale cell structure of the longitudinally extending distal portion can be configured based on the bone mineral density or bone quality.

By way of example, if the bone mineral density determined in step (iii) is 1 then the cells in the conformal microscale cell structure of the bone engaging portion 34 can be sized in the range of about 25 um to about 50 um in length.

By way of further example, if the bone mineral density determined in step (iii) is 2 then the cells in the conformal microscale cell structure of the bone engaging portion 34 can be sized in the range of about 28 um to about 50 um in length.

By way of further example, if the bone mineral density determined in step (iii) is 3 then the cells in the conformal microscale cell structure of the bone engaging portion 34 can be sized in the range of about 30 um to about 50 um in length.

By way of further example, if the bone mineral density determined in step (iii) is 4 then the cells in the conformal microscale cell structure of the bone engaging portion 34 can be sized in the range of about 35 um to about 50 um in length.

Once configured or designed, the implant can be fabricated or produced using, for example, additive layer manufacturing as described herein. The implant can be fabricated or produced from Titanium powder with a grain size of less than about 7 um. The implant can be fabricated using micro layer sintering, suitably, using a layer thickness during micro layer sintering of less than 6 um.

There is also disclosed a further method of configuring or designing or preparing an implant. It comprises: (i) providing a digital data set from a subject into which an implant is to be inserted, said digital data set comprising information on: the mandibular bone size and shape around a natural tooth in situ or a natural void in situ in which a natural tooth has previously been present; one or more anatomical structures around the natural tooth or the natural void, said anatomical structures selected from the group consisting of blood vessels, nerves, roots and the position of adjoining teeth or a combination of two or more thereof; and the marginal soft tissue thickness and the around the natural tooth in situ or the natural void in situ to determine the quantity of collagen fibers therein. It further comprises: (ii) configuring or designing or preparing an implant based on the digital data set obtained in step (i).

Step (ii) can comprise configuring the size, shape and micro hole structure of the implant based on the digital data set obtained in step (i).

The method can comprise designing a portion of an implant that abuts marginal soft tissue, suitably the transmucosal portion, based on the digital data set obtained in step (i).

According to this method, the implant can be customised according to the specific patient from which the results/data have been obtained.

In addition to size and shape, the micro holes in the transmucosal portion 43 can be configured based on the thickness of the marginal soft tissue.

By way of example, if the marginal soft tissue has a thickness of between about 0.6 mm to 0.7 mm the transmucosal portion 43 can be configured to comprise at least about 4 layers of micro holes, each layer comprising at least about 50 micro holes.

By way of further example, if the marginal soft tissue has a thickness of between about 0.6 mm to 0.7 mm the transmucosal portion is configured to comprise 4 or 5 layers of micro holes, each layer comprising at least about 50 micro holes.

By way of further example, if the marginal soft tissue has a thickness of between about 0.9 mm to 1.0 mm the transmucosal portion is configured to comprise at least about 6 layers of micro holes, each layer comprising at least about 50 micro holes.

By way of further example, if the marginal soft tissue has a thickness of between about 0.9 mm to 1.0 mm the transmucosal portion is configured to comprise 6 or 7 layers of micro holes, each layer comprising at least about 50 micro holes. By way of further example, if the marginal soft tissue has a thickness of between about 1.3 mm to about 1.5 mm the transmucosal portion 43 can be configured to comprise at least about 8 layers of micro holes, each layer comprising at least about 50 micro holes.

Accordingly, the distribution of the micro holes in the transmucosal portion 43 can be adapted or configured to facilitate or improve the integration of the transmucosal portion 43 with the collagen fibers in the marginal soft tissue of a subject into which the implant is to be inserted. Once configured or designed, the implant can be fabricated or produced using, for example, additive layer manufacturing as described herein. The implant can be fabricated or produced from Titanium powder with a grain size of less than about 7 um. The implant can be fabricated using micro layer sintering, suitably, using a layer thickness during micro layer sintering of less than 6 um.

To acquire the data for use in these methods, one or more 3D images or one or more 2D images can be recorded. The data can be obtained using CT scanning and/or CBCT scanning and/or intra-oral scanning, suitably in a DICOM and .STL format. The methods can comprise the additional step of fabricating or producing the implant.

The data can be used to construct an implant processing tool adapted to the implant to be implanted, suitably wherein the implant processing tool is selected from a positioning jig or a press fit tool for press fit insertion of the implant or a piezo tool for laser cutting bone.

Selecting the Configuration

There is also described herein methods that allow the configuration or design of an implant to be specifically customised for a subject based on the mineral density and/or quality of the bone surrounding the natural tooth in situ or the natural void in situ.

There is described a method of selecting the configuration of an implant comprising a conformal microscale cell structure for a subject. It comprises: (i) determining the mandibular bone mineral density and/or the mandibular bone quality around the natural tooth in situ or the natural void in situ of the subject. It further comprises: (ii) based on the result in step (i) configuring a bone engaging portion of the implant for the subject, wherein if the bone mineral density in the subject is 1 then the cells in the conformal microscale cell structure of the implant are sized in the range of about 25 um to about 50 um in length; or if the bone mineral density in the subject is 2 then the cells in the conformal microscale cell structure of the implant are sized in the range of about 28 um to about 50 um in length; or if the bone mineral density in the subject is 3 then the cells in the conformal microscale cell structure of the implant are sized in the range of about 30 um to about 50 um in length; or if the bone mineral density in the subject is 4 then the cells in the conformal microscale cell structure of the bone engaging portion 34 are sized in the range of about 35 um to about 50 um in length.

There is also described a method of selecting the configuration of an implant comprising a conformal microscale cell structure for a subject comprising: (i) providing a digital data set from the subject comprising information on the mandibular bone mineral density and/or the mandibular bone quality around the natural tooth in situ or the natural void in situ of the subject; and (ii) based on the information in step (i) configuring a bone engaging portion of the implant, wherein if the bone mineral density in the subject is 1 then the cells in the conformal microscale cell structure of the implant are sized in the range of about 25 um to about 50 um in length; or if the bone mineral density in the subject is 2 then the cells in the conformal microscale cell structure of the implant are sized in the range of about 28 um to about 50 um in length; or if the bone mineral density in the subject is 3 then the cells in the conformal microscale cell structure of the implant are sized in the range of about 30 um to about 50 um in length; or if the bone mineral density in the subject is 4 then the cells in the conformal microscale cell structure of the bone engaging portion 34 are sized in the range of about 35 um to about 50 um in length.

There is also described a method of selecting the configuration of an implant comprising micro holes for a subject comprising: (i) determining the marginal soft tissue thickness around the natural tooth in situ or the natural void in situ to determine the quantity of collagen fibers therein; and (ii) based on the information in step (i) configuring a transmucosal portion of the implant, wherein if the marginal soft tissue in the subject has a thickness of between about 0.6 mm to 0.7 mm the implant is designed to comprise at least 4 layers of micro holes in a transmucosal portion of the implant, each layer comprising at least about 50 micro holes; if the marginal soft tissue has a thickness of between about 0.9 mm to 1.0 mm the transmucosal portion is configured to comprise at least about 6 layers of micro holes, each layer comprising at least about 50 micro holes 86; or if the marginal soft tissue in the subject has a thickness of between about 1.3 mm to about 1.5 mm the transmucosal portion 43 comprises at least 8 layers of micro holes, each layer comprising at least about 50 micro holes.

There is also described a method of selecting the configuration of an implant comprising micro holes for a subject comprising: (i) providing a digital data set from the subject comprising information on the marginal soft tissue thickness around the natural tooth in situ or the natural void in situ to determine the quantity of collagen fibers therein; and (ii) based on the result in step (i) configuring the implant for the subject, wherein if the marginal soft tissue in the subject has a thickness of between about 0.6 mm to 0.7 mm the implant is designed to comprise at least 4 layers of micro holes in a transmucosal portion of the implant, each layer comprising at least about 50 micro holes; if the marginal soft tissue has a thickness of between about 0.9 mm to 1.0 mm the transmucosal portion is configured to comprise at least about 6 layers of micro holes, each layer comprising at least about 50 micro holes; or if the marginal soft tissue in the subject has a thickness of between about 1.3 mm to about 1.5 mm the transmucosal portion 43 comprises at least 8 layers of micro holes, each layer comprising at least about 50 micro holes. The methods can comprise the further steps of designing and producing the implant. The methods can comprise the further step of inserting the implant into the subject.

Manufacture

As described herein, accurate 3D topographical measurements are obtained to construct the implant 30—such as accurate 3D topographical measurements of a human or animal subject's intraoral cavity. This technology ensures a superior fit of the implant 30. The intraoral cavity can be scanned to provide a virtual model suitable for use within computer-assisted design and computer-assisted manufacture (CAD/CAM) methods. Such a system is described in US2011/105894. From the scanned digital data, software can create a digital 3D model of the human or animal subject's teeth and intraoral cavity.

Suitably, the portions of the implant—including the customised bone engaging portion—are fabricated using digital imaging data from CT/CBCT scanning and/or intra-oral scanning and the other data acquisition technologies and methods described herein.

The implants can be fabricated using 3D printing—such as 3D metal printing or 3D plastic printing. In those embodiments of the invention in which the implant is made entirely of metal—such as titanium the use of 3D metal printing is contemplated. —3D printing (also known as additive layer manufacturing or ALM) is the term used for the process of making a three-dimensional solid object by the laying down of successive layers of an extrudable and settable material from a moving dispenser. An example of such an apparatus is described in EP0833237. This describes an apparatus which incorporates a movable dispensing head provided with a supply of material which solidifies at a predetermined temperature, and a base member, which are moved relative to each other along "X", "Y," and "Z" axes in a predetermined pattern to create three-dimensional objects by building up material discharged from the dispensing head onto the base member at a controlled rate. Three-dimensional objects may be produced by depositing repeated layers of solidifying material until the shape is formed. A typical 3D printer comprises a moving head into which a plastic filament, typically about 3 millimetres in diameter, is fed. This passes over a heating mechanism and is forced through a nozzle which is formed, for example, of a metal or metal alloy such as brass. The nozzle comprises a circular aperture, for example of 0.35 millimetres diameter which deposits a thread of up to 1 millimetre in diameter. Such apparatus is usually computer controlled. Computer software executing on the computer typically translates a digital image into the required head movements to build up a three-dimensional object by successive thread deposition. One of the more common 3D printer technologies uses fused deposition modelling (FDM) or, more generally, fused filament fabrication (FFF). FDM printers work by using a plastic filament (for example, acrylonitrile butadiene styrene (ABS) or polylactic acid (PLA) provided as strands of filament that is 1 to 3 millimetres in diameter) that is unwound from a spool mounted onto the printer housing. The plastic filament is used to supply material to a print head with an extrusion nozzle, e.g., a gear pulls the filament off the spool and into the extrusion nozzle. The extrusion nozzle is adapted to turn its flow on and off. The extrusion nozzle (or an upstream portion of the print head) is heated to melt the plastic filament as it is passed into the extrusion nozzle so that it liquefies. The extrusion nozzle deposits the liquefied material in ultra fine lines, e.g., in lines that are about 0.1 millimetres across. The extrusion head and its outlet are moved, in both horizontal and vertical directions to complete or print each layer of the 3D model, by a numerically controlled mechanism that is operated by control software running on the 3D printer, for example, a computer-aided manufacturing (CAM) software package adapted for use with the 3D printer. The extruded melted or liquefied material quickly solidifies to form a layer (and to seal together layers of the 3D object), and the extrusion nozzle is then moved vertically prior to starting the printing of the next layer. This process is repeated until all layers of the 3D implant have been printed. There are a large number of additive processes now available. The main differences between the processes are in the way layers are deposited to create parts and in the materials that are used. Some methods melt or soften material to produce the layers, for example, selective laser melting (SLM) or DMLS, selective laser sintering (SLS), fused deposition modelling (FDM), or fused filament fabrication (FFF) or MLS, while others cure liquid materials using different sophisticated technologies, e.g. stereolithography (SLA). With laminated object manufacturing (LOM), thin layers are cut to shape and joined together (e.g. paper, polymer, metal).

CT/CBCT scanning of the tooth to be replaced or a void can be used to determine the geometrical spaces and shape of the portions of the implant. The DICOM file will provide the following information: (1) geometrical area and alignment of the tooth and neighbouring teeth or geometrical area and alignment of the void; (2) the bone mineral density of the mandibular bone; and (3) the height of the cortical bone (hard bone). Intraoral scanning can be used to determine the height of the soft tissue area and the design of the transmucosal portion 43 As required a histological test can also be carried out to examine the soft tissue.

DICOM data can then be transformed into a .STL file. The design of the implant 30 can be guided with CAD software to predetermine the exact design depending on the requirements of the subject. CAD/CAM Software is commercially available from various sources including Ansys.

For example, these requirements can include the exact length and exact diameter of the longitudinally extending distal portion 34 and the surface finish (for example, the porosity), the shape and height of the adjoining region 51 and the shape of the transmucosal portion 43. Adjoining region 51 may resemble or match the shape and dimensions of the in situ tooth in order to reduce or minimise the discrepancy of the implant with the former or missing tooth. The software can also be used to design the shape of the abutment portion 24.

To manufacture the designed implant, direct laser metal sintering (DLMS) can be used which favours a customisation of products via laser melting powder bed technology. It is an additive manufacturing technique that uses a laser fired into a bed of powdered metal. The laser is aimed automatically at points in space defined by a 3D model. The material is then joined together to create a solid structure. A .STL file is "sliced" into the layer thickness the machine will build in and downloaded to the DMLS or MLS machine. The process allows for highly complex geometries to be created directly from 3D CAD data, fully automatically; in a relatively short time and without any tooling. Layers up to about 10 microns can be melted individually in order to recreate shapes—such as undercuts—and with a range of micrometric details that cannot be manufactured with traditional technologies. Titanium powder can be used in this process and are melted continuously layer by layer. During the DLMS process, the implants are placed on individual piece layers numbered and coded for each patient. After the DLMS operation, the implant can be detached via EDM cutting and eventually finished in the surface requirement as described herein. Post-processing can include washing and polishing of the implants including air blasting, ultrasound washing in ionized water, sterilisation and packing. In one aspect, a method of manufacturing an implant is described comprising: (i) digitally imaging the shape of a natural tooth in situ or a natural void in situ in which a natural tooth has previously been present and/or digitally imaging a bone in situ; (ii) using the digital imaging data obtained in step (i) to fabricate a customised abutment portion with a substantially oval cross section on a proximal portion of an implant; (iii) using the digital imaging data obtained in step (i) to fabricate a customised bone engaging portion with a substantially oval cross section on a distal portion of the implant; and (iv) obtaining an implant.

Suitably, the exterior surface of the abutment portion is configured to be compatible with soft tissue—such as the gum line—in the mouth of a human or animal subject. Suitably, the exterior surface of the bone engaging portion is configured to facilitate or improve osseo-integration with bone. Suitably, the shape of the natural tooth and/or the bone is imaged using CT scanning and intra-oral scanning as described herein.

Implanting

Once the imaging has been completed and the clinician has access to the human or animal subject the implant can be inserted. In a further aspect, there is therefore provided a method of fitting or implanting an implant in a human or animal subject comprising contacting a void or bore in the human or animal subject with the implant of the present disclosure is described. One exemplary method of fitting the implant is shown in FIG. 7.

Immediate implant placement is one option if the jaw bone characteristics are acceptable to the clinician and the existing bone can be utilised.

If the dental implant needs to be placed at a former tooth extraction site, for example, at an edentulous site, void filling may be necessary. Here, the extraction void is filled with material—such as bone substitute material—to create a surface for placing of the dental implant. When the tooth is extracted from the human or animal subject to create a void previously occupied by the tooth, the void is contacted with the implant after partial or complete healing of the void. Suitably, the void is contacted with the implant 6 to 8 weeks after extraction of the tooth. Suitably, the void is contacted with the implant more than 8 weeks after extraction of the tooth, suitably, between 8 and 12 weeks after extraction of the tooth.

If the dental implant it to be placed at a site where a suitable void is not present then an artificial void may need to be created, for example, by drilling of a void or bore. Here, the artificial void or bore is shaped to precisely accommodate the shape of the implant.

The current “gold standard” for bone substitute material in dental implantology is bone surgically harvested from a second site in the body (autograft). Whilst autografting minimises the risk of tissue rejection, there are many drawbacks such as morbidity at the donor site, a painful harvesting procedure and extra cost. As an alternative to natural bone autografting, bone substitute material can be used and forms a particularly desirable embodiment of the present disclosure. Bone substitute material is of particular use when filling voids surrounding the implant, including voids located at the base of the implant. This can result in additional mechanical support to the implant and an improved integration of the implant into the bone.

Artificial bone substitutes are well known in the art (see for example, *Oral Maxillofac Surg Clin North Am.* (2007) 19(4):513-21 and *Craniomaxillofac Trauma Reconstr.* (2009) 2(3): 151 160.

A bone substitute can be a synthetic, inorganic or biologically organic combination. Methylmethacrylate, an acrylic resin, is an exemplary bone substitute. It can be combined with various metallic meshes to facilitate fixation and provide additional strength. Hydroxyapatite is a calcium phosphate compound that is the primary mineral component of teeth and bone. Clinically available, naturally occurring forms of HA include the coral-based products Interpore and Pro-osteon (Interpore International, Inc., Irvine, Calif.) as well as bovine derived products such as Bio-Oss (Geistlich Biomaterials, Geistlich, Switzerland), Osteograf-N(CeraMed Co., Denver, Colo.), and Endobon (Merck Co., Darmstadt, Germany). The synthetic HA product is Calcitite (Sulzer Calcitek, Carlsbad, Calif.). HA ceramics are manufactured in a variety of forms including granules and porous blocks.

Tricalcium phosphate (TCP) is a synthetic compound created by sintering precipitated calcium-deficient apatite with calcium phosphate in a ratio of 1:5. TCP is more soluble than HA due to its small granule size and porosity. A pure TCP product is commercially available as Vitoss (Orthovita, Inc., Philadelphia, Pa.).

Bioactive glass is a synthetic, osteoconductive, silica-containing particulate bone filler that forms an osteoconductive apatite layer at the bone-implant interface. This enhances bone attachment and promotes new bone growth. Collagen, mucopolysaccharides, and glycoproteins are recruited from the adjacent bone, facilitating early bonding of the bioactive glass with surrounding bone. Once mature, this bond has been shown to be stronger than the native bone itself.

Polymethylmethacrylate (PMMA) is an acrylic-based resin with broad applications. It may be prepared into a cement by mixing powdered methylmethacrylate polymer and liquid methylmethacrylate monomer, which polymerize during an exothermic reaction. PMMA is also available in block form.

As noted above, bone substitute material is of particular use when filling voids surrounding the implant or filling voids at the base of the implant. In the content of the present disclosure it is expected that in certain embodiments, filling at only the base of the void will be necessary since the sides of the implant will be precisely sized to fit the existing void.

The implant 30 can be press-fitted into the void to provide a precise seating of the implant 30 into the void. Owing to the precise fit of the implant 30 that can be achieved through the customisation described herein, it is contemplated that the action of the human or animal subject's bite pressing down on the implant 30 will be sufficient to precisely fit the implant 30 into the human or animal subject's mouth. In the alternative, hand pressure provided by the clinician or dentist onto the implant 30 can be sufficient to precisely fit the implant 30. The implant 30 benefits from the advantage of not requiring excessive pressure—such as hammering—to fit the implant 30. The use of excessive pressure is not only an unpleasant experience for the human or animal subject but it can also be highly disruptive to the surrounding bone and tissue and can extend healing times.

The bone tissue surrounding the implant 30 osseointegrates into the bone engaging portion 49 over time to firmly anchor the implant 30 into the surrounding bone structure. This is facilitated or improved through the use of the micro holes as described herein. Thereafter, a temporary or permanent prosthesis may be secured to the abutment portion 24. When fitting the implant 30 into a void, the precision fit between the surgical site and the implant 30 will be naturally tight enough so that the implant 30 immediately achieves the required degree of stability for immediate or early loading. The precision fit will further restrict rotational or twisting motion of the implant 30 within the void since the implant 30 does not have any clearance to rotate within the void. The precision fit may also accelerate osseointegration of the implant 30 owing to the high surface area contact between the bone engaging portion 49 and the in situ bone.

Suitably, the base of the customised abutment portion 24 abuts the natural bone or artificial bone. Prior to implanting, the base of the customised bone engaging portion 49 can be shaped to correspond to the shape of the natural bone or artificial bone.

In a further aspect, there is described a method of fitting an implant in a human or animal subject comprising: (i) identifying a void or bore into which the implant is to be inserted; (ii) shaping the void or the bore to accommodate the shape of all or a portion of the implant; and (iii) inserting an implant into the void or bore. The void may have been previously occupied by bone or tooth. The bore may be created or modified in the human or animal subject by drilling bone. The void can be shaped using piezo or laser as described herein. The method can further comprise attaching a prosthesis—such as a dental crown—to the implant.

Exemplary Workflow I

The manufacturing of one aspect of the implant of the present disclosure is a combination of digital, additive layer and mechanical work flows. In a first step, data acquisition using, for example, CB and/or CBCT and/or intra oral scanning technology is performed. Data evaluation—such as DICOM data evaluation—of the acquired data is then transformed using computer software to determine: bone size and shape and/or anatomical barriers—such as blood vessels, nerves position of adjoining teeth and/or bone mineral density and/or bone quality and/or soft tissue thickness and collagen fiber distribution. If required a histological test or physical examination can also be carried out to examine the soft tissue. As required, the design of the implant can be adjusted to take account of or to accommodate the anatomical barrier(s).

The Design for anatomical Intraoral Healing (DAIH) can be achieved using a CAD/CAM system to determine the complete shape of the implant according to a subject's need and is structured in designing the different areas of the implant. This can be used to generate a master .STL file for additive layer manufacturing of the whole implant as a one piece implant or as a two piece implant, as required, as well as a series of .STL files for determining secondary processes—such as surface structure and quantity and layout of micro holes.

The workflow can also be used to design jigs tools and guides to assist in the insertion of the implant.

Once the workflow is complete, additive layer manufacturing (ALM) can be used to fabricate or produce the implant. ALM is a well-known manufacturing technology also known as 3D printing. The implant described herein can be manufactured in Titanium TI 64 powder having a grain size smaller than 7 um. The chemical composition can correspond to ISO 5832-3, ASTM F1472 and ASTM B348. One ALM technology that can be used to build the implant is DMLS. Due to its high grade of resolution with layers of 5 um it is also called MLS. Starting from a CAD model or .STL file for example, it is transformed and split into several cross sections, called layers. During manufacturing, a thin layer of powder of about 4 to about 10 um can be applied to a build platform. The powder is selectively fused by a laser beam with a focal of about 15 um or smaller according to each cross section in a closed chamber with atmospheric control. The building platform is then lowered, and the procedure of powder coating, fusing and platform lowering is repeated layer by layer, until the build is completed. ALM machines enable unique capabilities including: shape complexity, customised geometries, shape optimisation, material complexity (where material can be processed at one point, or one layer, at a time, enabling the manufacture of parts with complex material compositions and designed property gradients) and hierarchical complexity (where multi-scale structures can be designed and fabricated from the microstructure through geometric mesostructure cellular material or lattice structure including sizes below the millimeter range with a wall thickness of 15 microns to the part-scale macrostructure). MLS is a powder bed based additive manufacturing technology, often called also Selective Laser Sintering or Selective Laser Melting.

Once the implant is fabricated or built, secondary operations can be performed. The implant can be detached from the build platform. The implant can be cleaned to remove any possible grain of powder not being sintered. Washing can include air blasting and/or ultrasound washing in ionized water. The surfaces can be polished as required. The micro holes in the transmucosal area can be drilled using, for example, a visual or infrared spectral range laser in order to drill the desired amount of holes that can range in size from 1 um to 15 um in diameter in a number and a layout that is determined via intraoral scan etc to facilitate or improve the binding of collagen fiber to the implant.

Coating of the bone engaging portion with non-biological coating can then be performed.

After a final inspection on the mechanical characteristics, the implant can be sterilised and packed.

Implant tools can also be configured including: (a) a positioning jig for initial bone drilling operation. This can be produced using Selective Layer Sintering in plastics; (b) a positioning jig for piezo finishing bone modelling operation or laser finishing bone modelling operation. This can be produced using Selective Layer Sintering in plastics; (c) a piezo custom made tool for bone modelling operation—such as laser cutting bone—can be produced using DLMS technology; and (d) a press-fit tool for press-fit insertion, which can be produced using DLMS technology.

Exemplary Workflow II

Another example of a workflow to prepare and fit an implant 30 according to the present disclosure is now described. In the first stage, pre-operative tooth dimension and alignment, soft tissues and anatomical barriers are assessed. This is achieved using CT DICOM data generated via CBCT scanning of the tooth and the jaws. .STL data is generated from scanning of the dental jaws. In the next stage, the 3D geometry of the tooth is used to create the personalised implant geometry and surface(s). CT DICOM and .STL data (for example, selected slices) of the tooth, jaw and soft tissues is used. Scanned CT slices are displayed at the correct separation and the centre of the tooth and the size is determined. The bone mineral density of the tooth can be determined if required. The implant is automatically partitioned in 3 different areas with suggested dimensions and surface porosities/roughness as required. The other areas of the implant—such as the bone engaging portion, the adjoining region (crestal anti rotational oval) and abutment with optional platform shifting are incorporated into the design. The implant design is automatically fitted inside the tooth space in order to simulate the positioned implant and verify the fitting according to jaw anatomy and occlusal relationships. Points can be automatically or manually added or corrected as required. The corrected implant can be automatically fixed at its relevant points— (a) centre and diameter of bone engaging portion; (b) shape of the adjoining region (crestal anti rotational oval)—such as cross sectional area, height and/or contour); and (c) shape and height of the abutment portion. Neighbouring teeth can be automatically used as a centring point for the use of surgical placement guide (for example, a drilling jig). The shape of the adjoining region (crestal anti rotational oval) can be automatically used to determine the size and shape of a piezo tool and jig for surgery purposes, or a jig for light laser operation purposes. The optimised implant and jig design is saved. A corrected alignment visualisation by cutting and rotating the background CT data is automatically generated. Pre- and post-operative visualisation is displayed side-by-side. Key information of implant, tools and surgical placement guide is saved in a database as an .STL file. In the next stage, data is transmitted, the implant is manufactured and then shipped. The transmitted data is verified DLMS workflow is simulated in time material content and structural stiffness of the implant and differentiated porosity of the implant according to the bone mineral density of the patient. Key dimensional data (for example, height, width and shape) of the implant is simulated in order to have a dimensional crosscheck reference for the implant, the drilling jig, the piezo tool and the light laser jig. The custom implant is fabricated. A piezo tool jig is fabricated. As required, a piezo tool and surgical placement guide is fabricated if required. The fabricated parts are washed, decontaminated, checked, packaged and delivered. In the next stage, the implanted is fitted. Following local anaesthesia, the digitally-generated surgical guide is applied to the subject, the implant site is prepared, firstly with guided calibrated drills and then secondly with piezo surgery (custom tools) and/or laser. The implant is inserted by press fit of the custom implant. The custom abutment is connected. If digital data of jaw movements has been captured then prosthetic restorations ready for insertion after a full virtual design software can be carried out.

Void

A void can encompass any void in a human or animal subject's tissue, including natural voids, artificial voids or artificial bores. A void can be created by the loss of bone. A void can be created by the loss of one or more teeth. A bore can be created by drilling into bone. A bore can be created by drilling into part of a tooth.

Kit

The implant 30 can be included in a kit which can be used to fit the human or animal subject's needs, optionally together with a set of instructions.

Computer

There is also disclosed a computer program which when executed by a computer/processor is operable to control the computer to perform one or more of the methods described herein. A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements including the processors or logic, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

Further aspects of the present disclosure are set forth in the following numbered paragraphs:

1. An implant (30) comprising a bone engaging portion (49) positioned at the distal end of the implant (30), said bone engaging portion (49) comprising: a longitudinally extending distal portion (34); and an adjoining region (51) positioned at the proximal end of the longitudinally extending distal portion (34), wherein the cross sectional area of the proximal end of the longitudinally extending distal portion (34) is less than the cross sectional area of the distal end and/or the proximal end of the adjoining region (51); and wherein the longitudinally extending distal portion (34) has a circular cross section, and wherein the adjoining region (51) has a non-circular cross section, suitably an oval cross section.

2. The implant (30) according to paragraph 1, wherein the cross sectional area of the proximal end of the longitudinally extending distal portion (34) is less than the cross sectional area of the proximal end of the adjoining region (51).

3. The implant (30) according to paragraph 2, wherein the adjoining region (51) transitions outwardly from its distal end towards its proximal end.

4. The implant (30) according to paragraph 1, wherein the cross sectional area of the proximal end of the longitudinally extending distal portion (34) is less than the cross sectional area of the distal end and the proximal end of the adjoining region (51).

5. The implant (30) according to paragraph 4, wherein the adjoining region (51) is a shoulder (79), suitably, wherein one or more corners of the shoulder (79) are non-angular, suitably wherein the one or more corners of the shoulder (79) are rounded.

6. The implant (30) according to any of the preceding paragraphs, wherein there is a lofted transition between the proximal end of the longitudinally extending distal portion (34) and the distal end of the adjoining region (51).

7. The implant (30) according to any of the preceding paragraphs, wherein the cross sectional area of the distal end and/or the proximal end of the adjoining region (51) corresponds to the cross sectional area between adjoining soft tissue of a subject which abuts bone, suitably wherein the long axis width of the distal end and/or the proximal end of the adjoining region (51) is about 5 to about 15 millimetres greater than the long axis width of the proximal end of the longitudinally extending distal portion (34).

8. The implant (30) according to any of the preceding paragraphs, wherein the longitudinally extending distal portion (34) is substantially cylindrical in shape.

9. The implant (30) according to any of the preceding paragraphs, wherein the longitudinally extending distal portion (34) is rounded at the distal end.

10. The implant (30) according to any of the preceding paragraphs, wherein the shape of the substantially cylindrical part (34) and the shape of the adjoining region (51) correspond to the shape of adjoining bone of a subject into which the implant is to be fitted, suitably, wherein there is no intervening space between the adjoining bone and the outer surfaces of the substantially cylindrical part (34) and the adjoining region (51) when the implant (30) is fitted.

11. The implant (30) according to any of the preceding paragraphs, wherein the bone engaging portion (49) is a press-fit or a frictional fit or an interference fit with bone into which the implant (30) is inserted.

12. The implant (30) according to any of the preceding paragraphs, further comprising a transmucosal portion (43) positioned at the proximal end of the adjoining region (51) and comprising an inwardly narrowed part (43), suitably, wherein the transmucosal portion (43) has a non-circular cross section, suitably wherein the non-circular cross section is an oval cross section.

13. The implant (30) according to paragraph 12, wherein the adjoining region (51) narrows from the distal end in the proximal direction towards its middle and then widens in the proximal direction.

14. The implant (30) according to paragraph 13, wherein the cross sectional area of the inwardly narrowed part (43) corresponds to the cross sectional area between adjoining soft tissues of a subject into which the implant is to be fitted.

15. The implant (30) according to paragraph 12, wherein the transmucosal portion (43) is platform shifted, suitably wherein the cross sectional area of the distal end of the transmucosal portion (43) is less than the cross sectional area of the proximal end of the adjoining region (51).

16. The implant (30) according to any of paragraphs 12 to 15, further comprising an abutment portion (24) positioned at the proximal end of the transmucosal portion (43), wherein said abutment portion (24) is adapted to support a prosthesis at its distal end, suitably, wherein the abutment portion (24) has a non-circular cross section, suitably wherein the non-circular cross section is an oval cross section.

17. The implant (30) according to paragraph 16, further comprising a prosthesis reversibly or non-reversibly engaged with the abutment portion (24), suitably, wherein the prosthesis is a dental crown (96).

18. The implant (30) according to any of the preceding paragraphs, wherein the implant is a two piece implant in which the bone engaging portion (49) forms one piece of the implant and the transmucosal portion (43), optionally together with the abutment portion (24), forms the other piece of the implant, suitably wherein the pieces of the implant are reversibly attached to each other, suitably wherein the pieces of the implant are screwed to each other.

19. The implant (30) according to any of the preceding paragraphs, wherein the implant is a one-piece implant.

20. The implant (30) according to any of the preceding paragraphs, wherein the shape and size of the bone engaging portion (49) corresponds to the shape and size of the in situ void into which the implant (30) is to be inserted such that, when the implant is fitted, there is no intervening space between the surface of the bone engaging portion (49) and the in situ void.

21. The implant (30) according to any of the preceding paragraphs, wherein the longitudinal height of the longitudinally extending distal portion (34) is between about 3 to 6 millimetres; the longitudinal height of the adjoining region (51) is between about 2 to 5 millimetres in height; the longitudinal height of the transmucosal portion (43) is between about 3 millimetres in height; and the longitudinal height of the abutment portion (24) is between about 5 to 7 millimetres in height.

22. The implant (30) according to any of the preceding paragraphs, wherein the implant (30) is a 3D printed implant, suitably, a 3D metal printed implant (30) or a 3D plastic printed implant (30).

23. The implant (30) according to any of the preceding paragraphs, wherein the adjoining region (51) and the abutment portion (24) have a first exterior surface that is compatible with soft tissue, suitably soft tissue in the mouth of a subject.

24. The implant (30) according to any of the preceding paragraphs, wherein the bone engaging portion (49) has a second exterior surface (44) adapted to facilitate osseo-integration with bone.

25. The implant (30) according to paragraph 24, wherein the first exterior surface is different to the second exterior surface (44).

26. The implant (30) according to any of the preceding paragraphs, wherein at least the exterior surface of the adjoining region (51) and the abutment portion is non-porous, suitably, wherein the entire exterior surface of the adjoining region (51) and the abutment portion is non-porous, suitably, wherein the entire adjoining region (51) and the entire abutment portion is non-porous.

27. The implant (30) according to any of the preceding paragraphs, wherein the entire adjoining region (51) and the entire abutment portion (24) is fabricated exclusively from the same material, suitably, wherein the entire adjoining region (51) and the entire abutment portion (24) is fabricated exclusively from one material, suitably, wherein the material is titanium or zirconium oxide or polyether ether ketone (PEEK) or Polyetherketoneketone (PEKK).

28. The implant (30) according to any of the preceding paragraphs, wherein at least the exterior surface of the bone engaging portion (49) is porous or rough, suitably, wherein the entire exterior surface of the bone engaging portion (49) is porous or rough, suitably, wherein the entire bone engaging portion (49) is porous or rough.

29. The implant (30) according to paragraph 28, wherein the porosity or roughness of the bone engaging portion (49) decreases towards the transmucosal portion (43).

30. The implant (30) according to paragraph 28, wherein the porosity or roughness of the longitudinally extending distal portion (34) and the adjoining region (51) is the same or different.

31. The implant (30) according to any of paragraphs 28 to 30, wherein the bone engaging portion (49) comprises pores.

32. The implant (30) according to paragraph 31, wherein the bone engaging portion (49) comprises a gradation of pore sizes, suitably, wherein the pore size decreases towards the transmucosal portion (43).

33. The implant (30) according to paragraph 31 or paragraph 32, wherein the pores form a network of channels through the exterior surface of the bone engaging portion (49) such that, in use, bone grows into the exterior surface of the bone engaging portion (49), or wherein the pores form a network of channels through the entirety of the bone engaging portion (49), such that, in use, bone can grow into the bone engaging portion (49).

34. The implant (30) according to any of the preceding paragraphs, wherein the bone engaging portion (49) is fabricated exclusively from the same material, suitably, wherein the bone engaging portion (49) is fabricated exclusively from one material, suitably, wherein the material is titanium or zirconium oxide or polyether ether ketone (PEEK) or Polyetherketoneketone (PEKK).

35. The implant (30) according to any of the preceding paragraphs, wherein two or more of the longitudinally extending distal portion (34) and/or the adjoining region (51) and/or the transmucosal portion (43) and/or the abutment portion (24) are fabricated exclusively from the same material, suitably, fabricated exclusively from one material, suitably, wherein the material is titanium or zirconium oxide or polyether ether ketone (PEEK) or Polyetherketoneketone (PEKK).

36. The implant (30) according to any of the preceding paragraphs, wherein the implant (30) is fabricated from titanium or zirconium oxide, suitably, wherein the implant (30) is fabricated exclusively from titanium or zirconium oxide or polyether ether ketone (PEEK) or Polyetherketoneketone (PEKK).

37. The implant (30) according to any of the preceding paragraphs, wherein the exterior surface of the abutment portion (24) and/or the transmucosal portion (43) is a polished surface.

38. The implant (30) according to any of the preceding paragraphs, wherein at least the exterior surface of the bone engaging portion (49) has an interlaced appearance or a meshed appearance or is a roughened surface.

39. The implant (30) according to any of the preceding paragraphs, wherein the bone engaging portion (49) comprises a coating (44) to further facilitate osseointegration with bone.

40. The implant (30) according to paragraph 39, wherein the coating (44) is a non-biological coating.

41. The implant (30) according to paragraph 40, wherein the non-biological coating comprises or consists of magnesium and/or calcium and/or hydroxyapatite and/or brushite.

42. The implant (30) according to any of the preceding paragraphs, wherein a prosthesis—such as a dental crown (96)—is attached or reversibly attached to the abutment portion (24).

43. The implant (30) according to any of the preceding paragraphs, wherein the bone engaging portion (49) is adapted to engage natural bone or artificial bone or a combination thereof.

44. The implant (30) according to any of the preceding paragraphs, wherein the bone engaging portion (49) is a customised bone engaging portion (49), suitably, a digitally customised bone engaging portion (49); and/or the implant (30) according to any of paragraphs 11 to 43, wherein the transmucosal portion (51) is a customised transmucosal portion (51), suitably, a digitally customised transmucosal portion (51); and/or the implant (30) according to any of paragraphs 15 to 43, wherein the abutment portion (24) is a customised abutment portion (51), suitably, a digitally customised abutment portion (51).

45. The implant (30) according to any of the preceding paragraphs, wherein the implant (30) is a customised implant, suitably a digitally customised implant.

46. The implant (30) according to any of the preceding paragraphs, wherein the implant (30) is a dental implant.

47. The implant (30) according to any of the preceding paragraphs, wherein the bone engaging portion (49) contains a hole (61) at the distal end that is transverse to the longitudinal axis of the implant (30) to facilitate osseointegration with bone.

48. A method of manufacturing an implant comprising: (i) digitally imaging the shape of a natural tooth in situ or a natural void in situ in which a natural tooth has previously been present and/or digitally imaging a bone in situ and/or digitally imaging soft tissue in situ adjacent to bone; (ii) using the digital imaging data obtained in step (i) to fabricate the implant according to any of paragraphs 1 to 47; and (iii) obtaining an implant.

49. The method according to paragraph 48, wherein the shape of the natural tooth in situ or the natural void in situ and/or the bone in situ is imaged using CT scanning.

50. The method according to paragraph 48 or paragraph 49, wherein the shape of the soft tissue in situ is imaged using intra-oral scanning.

51. The method according to any of paragraphs 48 to 50, wherein the implant is fabricated using 3D printing, suitably, 3D metal printing or 3D plastic printing.

52. An implant obtained or obtainable by the method of any of paragraphs 48 to 51.

53. A method of fitting an implant in a human or animal subject comprising contacting a void or bore of a human or animal subject with the implant (30) according to any of paragraphs 1 to 47 and 52, suitably, wherein the void is in the mouth of the human or animal subject.

54. The method according to paragraph 53, wherein the void was previously occupied by bone or tooth.

55. The method according to paragraph 53 or paragraph 54, wherein the void is created or modified in the human or animal subject by drilling bone.

56. The method according to paragraph 55, wherein following the drilling of bone, the void is shaped to match the shape of all or a portion of the bone engaging portion (49) of the implant (30).

57. The method according to paragraph 56, wherein the void is shaped to match the shape of at least the adjoining region (51) of the implant (30).

58. The method according to paragraph 56 or paragraph 57, wherein the void is shaped using piezo or laser.

59. The method according to any of paragraphs 53 to 58, further comprising attaching a prosthesis—such as a dental crown (96)—to the abutment portion (24) of the implant.

60. The method according to any of paragraphs 54 to 59, wherein the tooth is extracted from the human or animal subject to create a void previously occupied by the tooth and the void is contacted with the implant after partial or complete healing of the void.

61. The method according to paragraph 60, wherein the void is contacted with the implant (30) 6 to 8 weeks after extraction of the tooth.

62. The method according to paragraph 60, wherein the void is contacted with the implant more than 8 weeks after extraction of the tooth, suitably, between 8 and 12 weeks after extraction of the tooth.

63. A method of fitting an implant in a human or animal subject comprising: (i) identifying a void or bore in bone into which an implant is to be inserted; (ii) shaping the void or the bore in the bone to accommodate the shape of all or a portion of the implant; and (iii) inserting an implant into the void or bore.

64. The method according to paragraph 63, wherein the void was previously occupied by bone or tooth.

65. The method according to paragraph 63 or paragraph 64, wherein the bore is created or modified in the human or animal subject by drilling bone.

66. The method according to any of paragraphs 63 to 65, wherein the void is shaped using piezo or laser.

67. The method according to any of paragraphs 63 to 66, further comprising attaching a prosthesis to the implant.

68. The method according to any of paragraphs 63 to 67, wherein the implant (30) is the implant (30) according to any of paragraphs 1 to 47 or 52.

69. An implant (30) or method substantially as described herein with reference to the accompanying description and drawings.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents. Any publication cited or described herein provides relevant information disclosed prior to the filing date of the present application. Statements herein are not to be construed as an admission that the inventors are not entitled to antedate such disclosures. All publications mentioned in the above specification are herein incorporated by reference.

The invention claimed is:

1. An implant comprising:

(a) a bone engaging portion positioned at the distal end of the implant, said bone engaging portion comprising:
  a longitudinally extending distal portion; and
  an adjoining region positioned at the proximal end of the longitudinally extending distal portion;

(b) a transmucosal portion positioned at the proximal end of the adjoining region; and (c) an abutment portion positioned at the proximal end of the transmucosal portion, wherein:

the longitudinally extending distal portion comprises a conformal lattice structure comprising nodes and a set of struts that connect the nodes to form a plurality of cells, said plurality of cells forming a mesh, at least a portion of said mesh being a hexahedral mesh formed of hexahedral cells, and at least a subset of the hexahedral cells include cell-to-cell geometric variability so that the mesh conforms to a curved exterior surface of the longitudinally extending distal portion;

the subset of the hexahedral cells includes a first hexahedral cell adjacent to a second hexahedral cell, the first hexahedral cell and the second hexahedral cell being disposed at the curved exterior surface of the longitudinally extending distal portion;

the first hexahedral cell has a first geometry defined by a first set of nodes and a first set of distances between respective pairs of nodes of the first set of nodes, the first hexahedral cell having a first outer plane defined by outer nodes of the first hexahedral cell that are disposed on the exterior surface, the second hexahedral cell has a second geometry defined by a second set of nodes with a second set of distances between respective pairs of nodes of the second set of nodes, the second hexahedral cell having a second outer plane defined by outer nodes of the second hexahedral cell that are disposed on the exterior surface, the first geometry of the first hexahedral cell is different than the second geometry of the second hexahedral cell such that the first outer plane is disposed at an angle relative to the second outer plane that matches a curvature of the curved exterior surface at the first and second hexahedral cells, the exterior surface of the abutment portion is polished;

a part of the exterior surface of the adjoining region comprises a roughened surface and a part of the exterior surface of the adjoining region comprises a polished finish at the proximal end of the adjoining region;

the exterior surface of the transmucosal portion comprises a plurality of micro holes; and the sizes of the cells in the conformal lattice structure are based on a non-transitory digital data set obtained from a subject and comprising data relating to the mandibular bone mineral density and/or bone quality around a natural tooth in situ or a natural void in situ.

2. The implant according to claim 1, wherein the longitudinally extending distal portion comprises a screw thread.

3. The implant according to claim 1, wherein the shape, size and height of the abutment portion is adapted to fit a subject into which the implant is to be inserted.

4. The implant according to claim 1, wherein the portion of the exterior surface of the adjoining region comprising the polished finish at the proximal end thereof has a mirrored finish, a super mirrored finish, or a height of about 100 μm.

5. The implant according to claim 1, wherein the shape, size and height of the adjoining region is adapted to fit a subject into which the implant is to be inserted; and/or where the transmucosal portion is adapted to conform to the thickness of the marginal soft tissue of a subject into which the implant is to be inserted; and/or wherein the implant is made of titanium.

6. The implant according to claim 1, wherein the implant is a one-piece or a two piece implant.

7. The implant according to claim 1, wherein each part of the implant is shaped to fit the subject into which the implant is to be inserted.

8. The implant according to claim 1, wherein the plurality of micro holes are in a regularly spaced arrangement or a random arrangement.

9. The implant according to claim 1, wherein the conformal lattice structure is a microscale structure, including cells sized in the range of about 20 to 50 μm.

10. The implant according to claim 1, wherein the porosity of the exterior surface of the longitudinally extending distal portion of the bone engaging portion decreases from a distal end of the longitudinally extending distal portion towards the proximal end of the longitudinally extending distal portion.

11. The implant according to claim 1, wherein the entire length of the longitudinally extending distal portion of the bone engaging portion comprises the conformal lattice structure.

12. The implant according to claim 1, wherein the micro holes of the exterior surface of the transmucosal portion comprise machined micro holes.

13. The implant according to claim 1, wherein the size of the micro holes are based on the non-transitory digital data set obtained from the subject.

* * * * *